Nov. 14, 1967  R. C. JORDAN  3,352,737
MACHINE FOR MANUFACTURING A COLOSTOMY DRAINAGE DEVICE
Filed Jan. 8, 1964  15 Sheets-Sheet 6

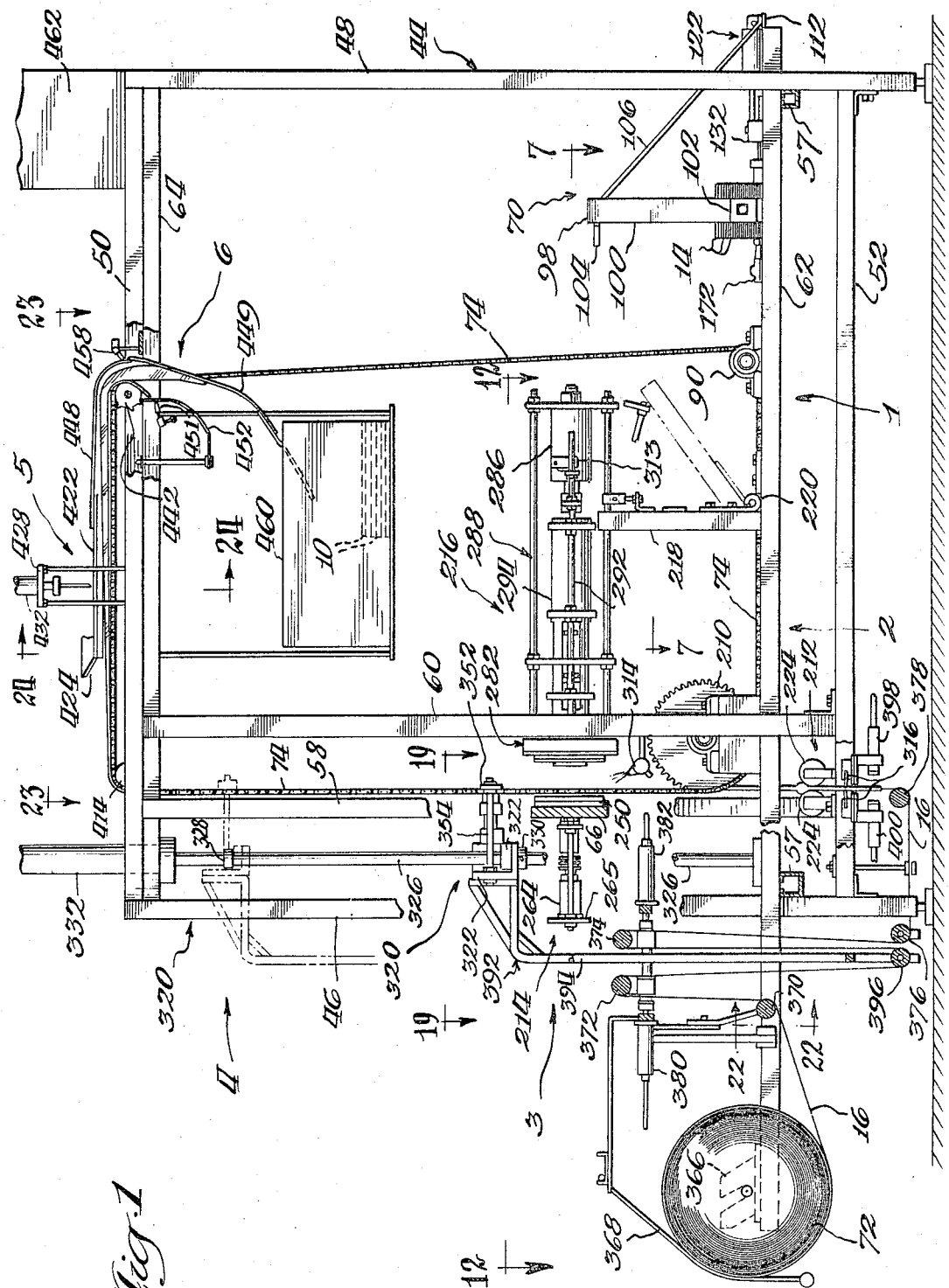

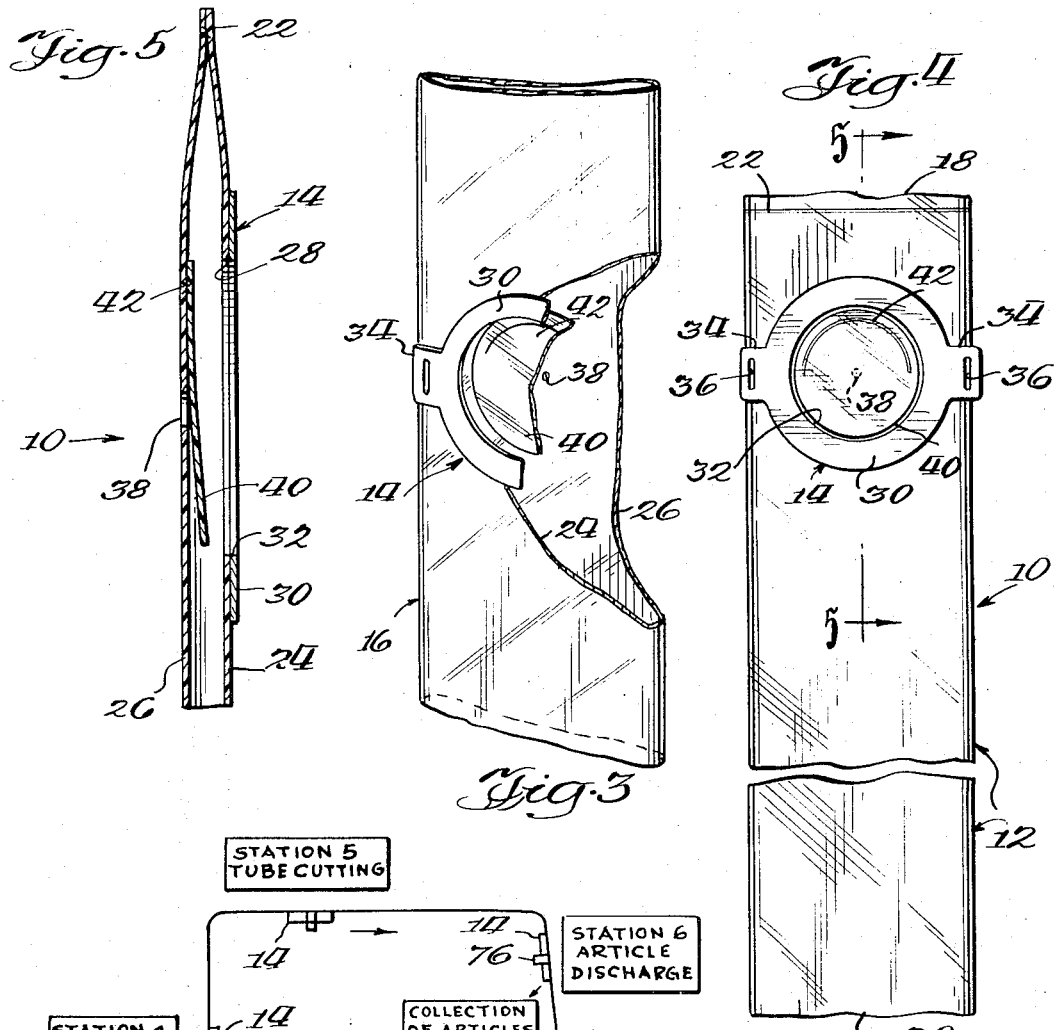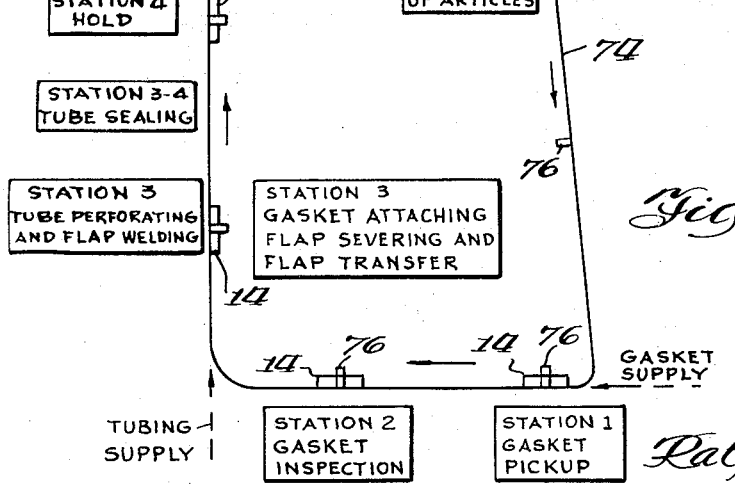

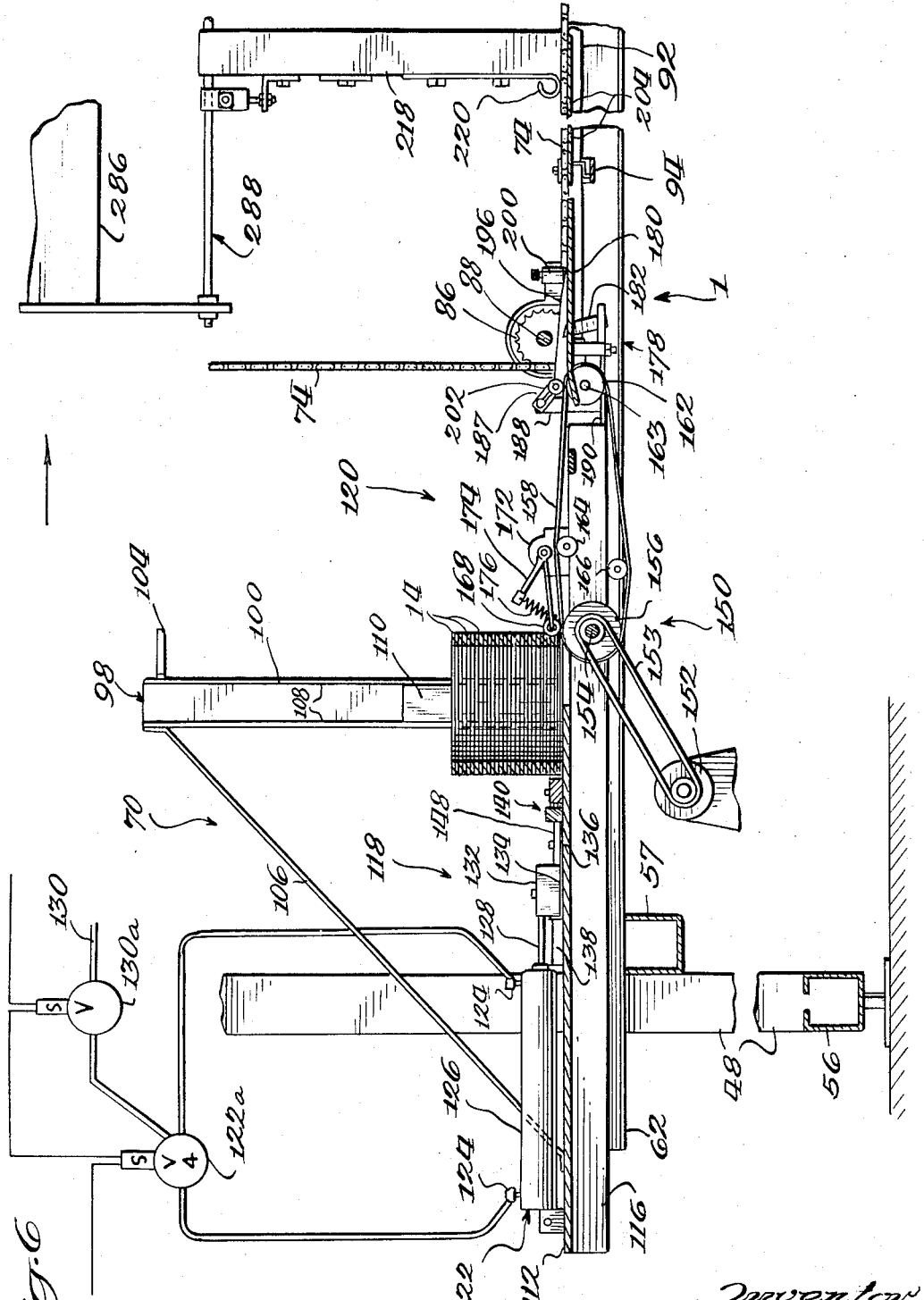

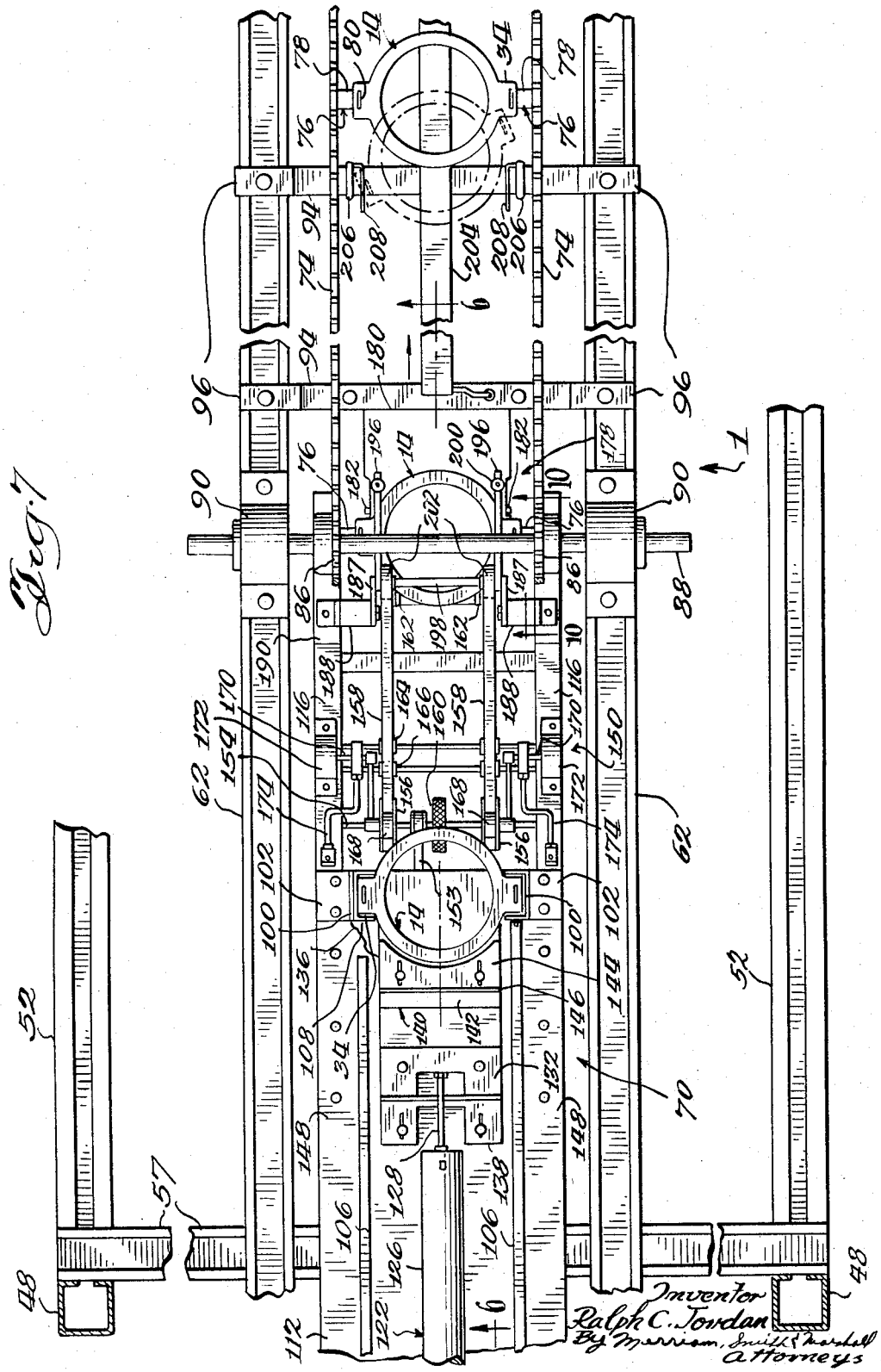

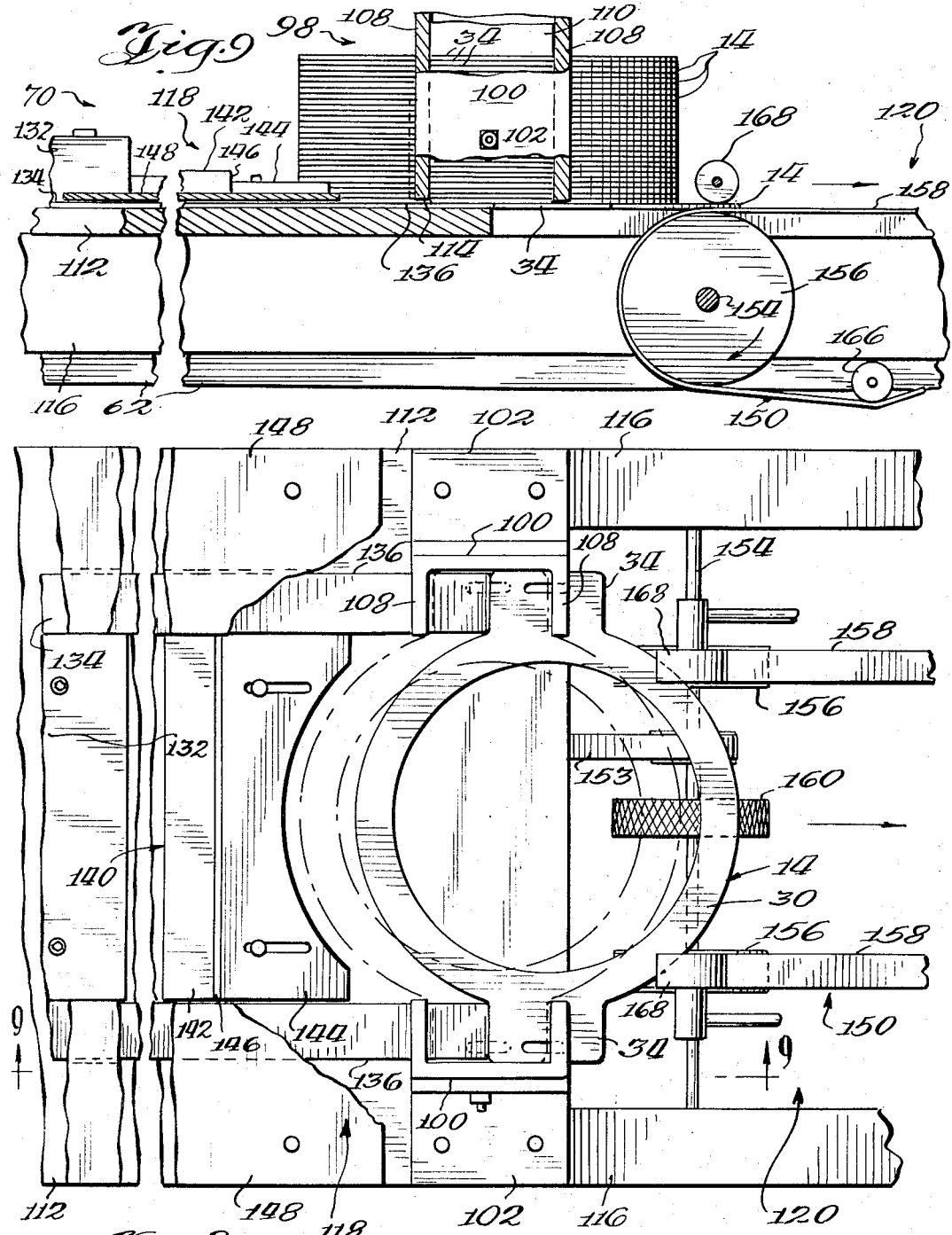

Inventor
Ralph C. Jordan
By
Merriam, Smith & Marshall
Attorneys

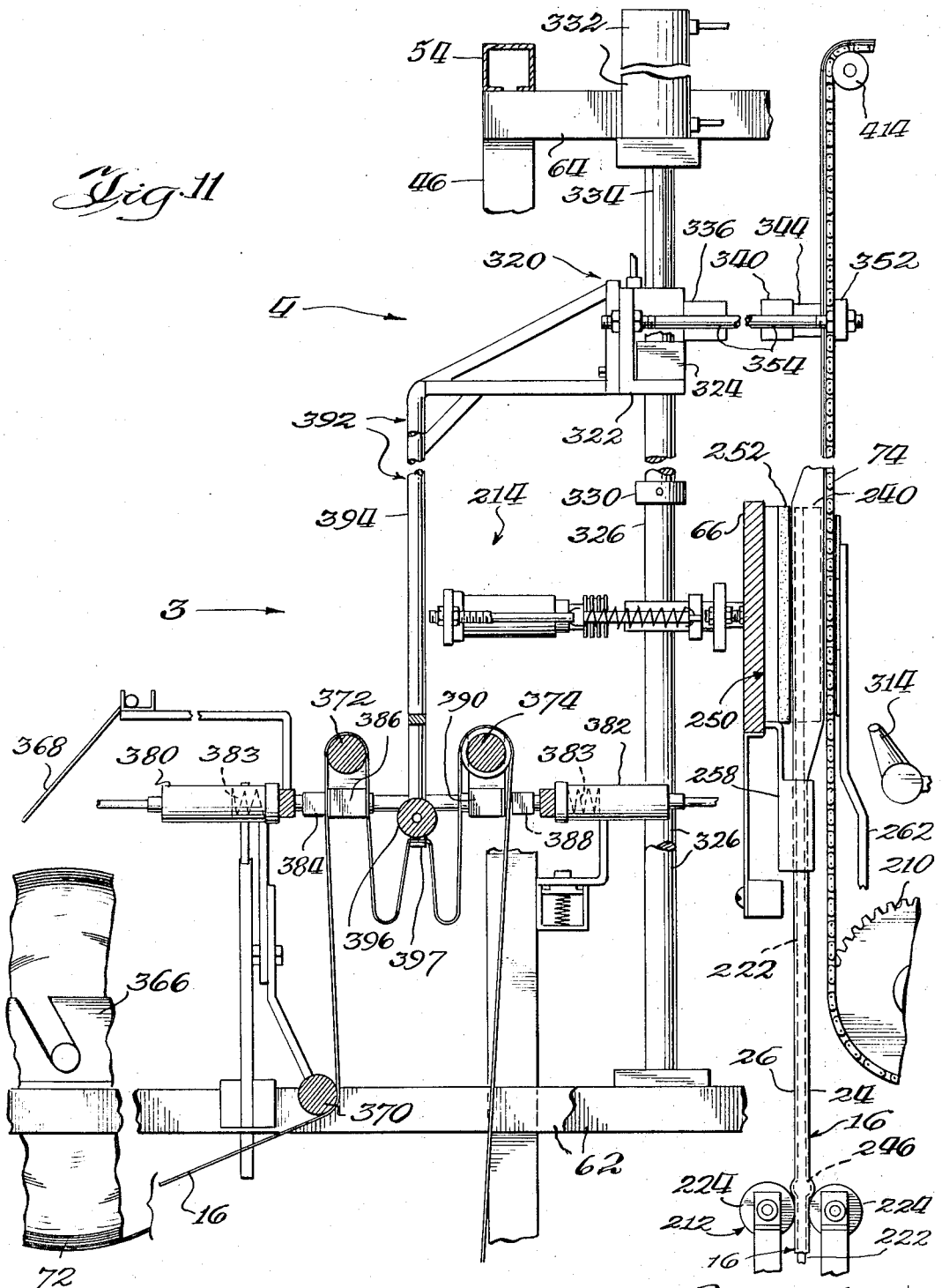

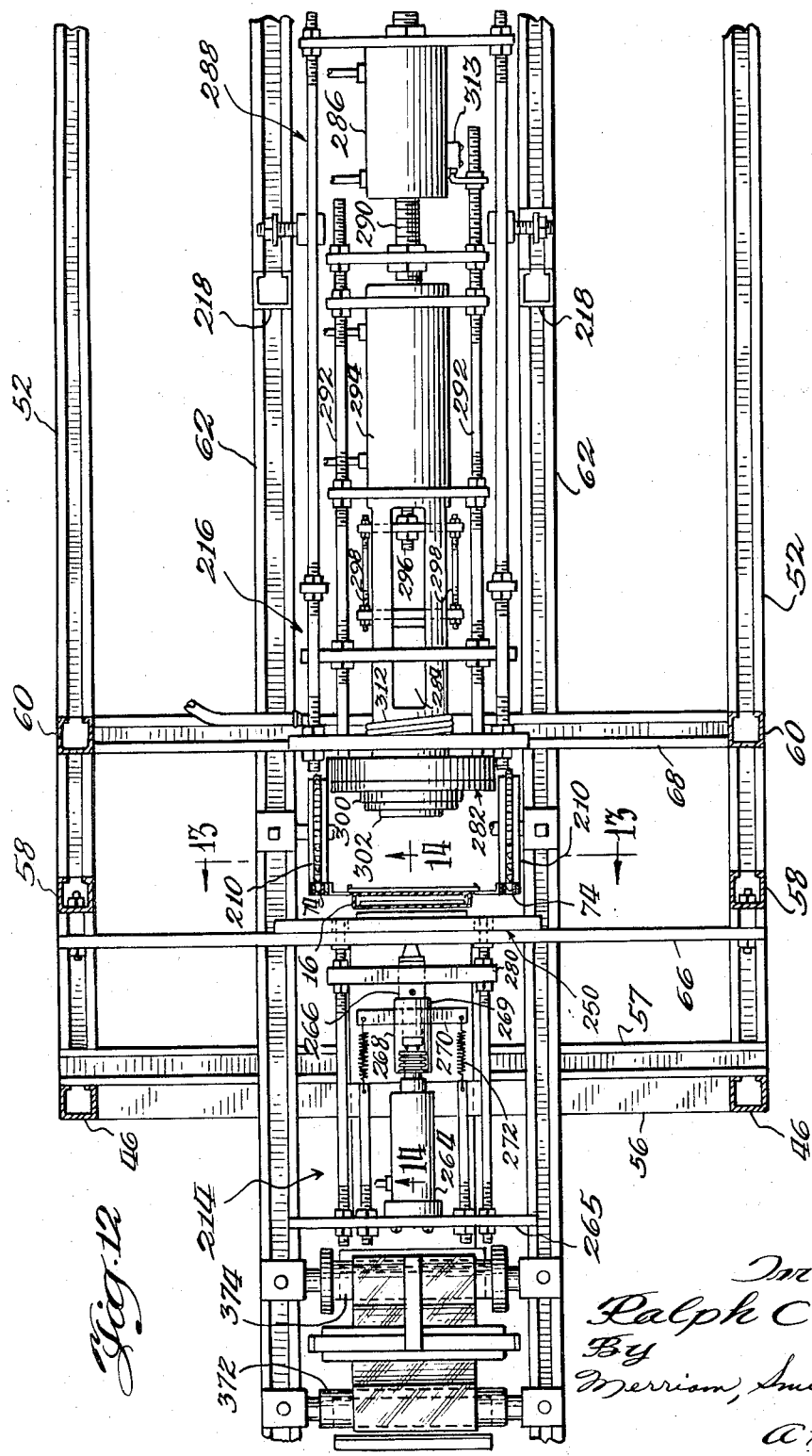

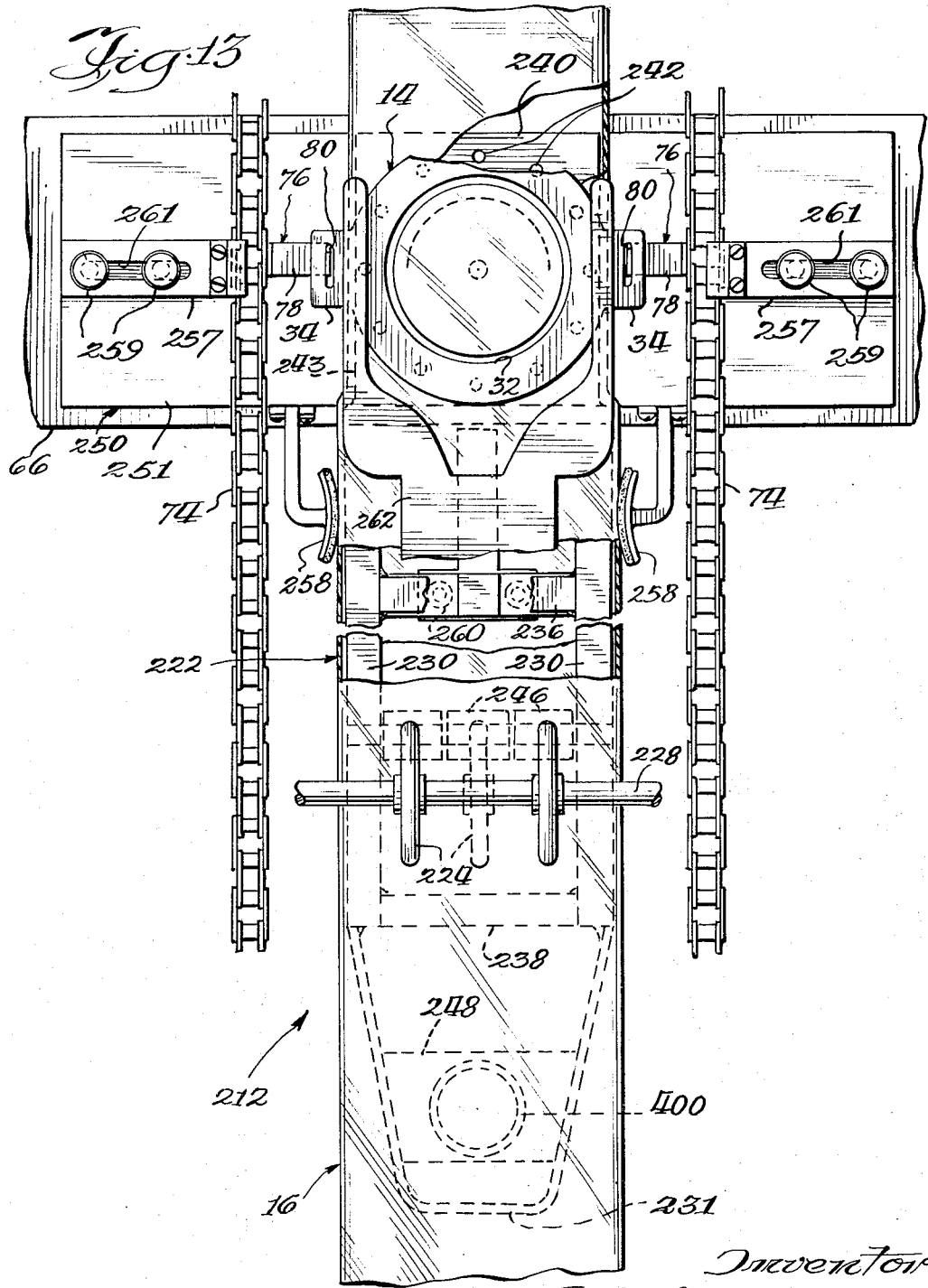

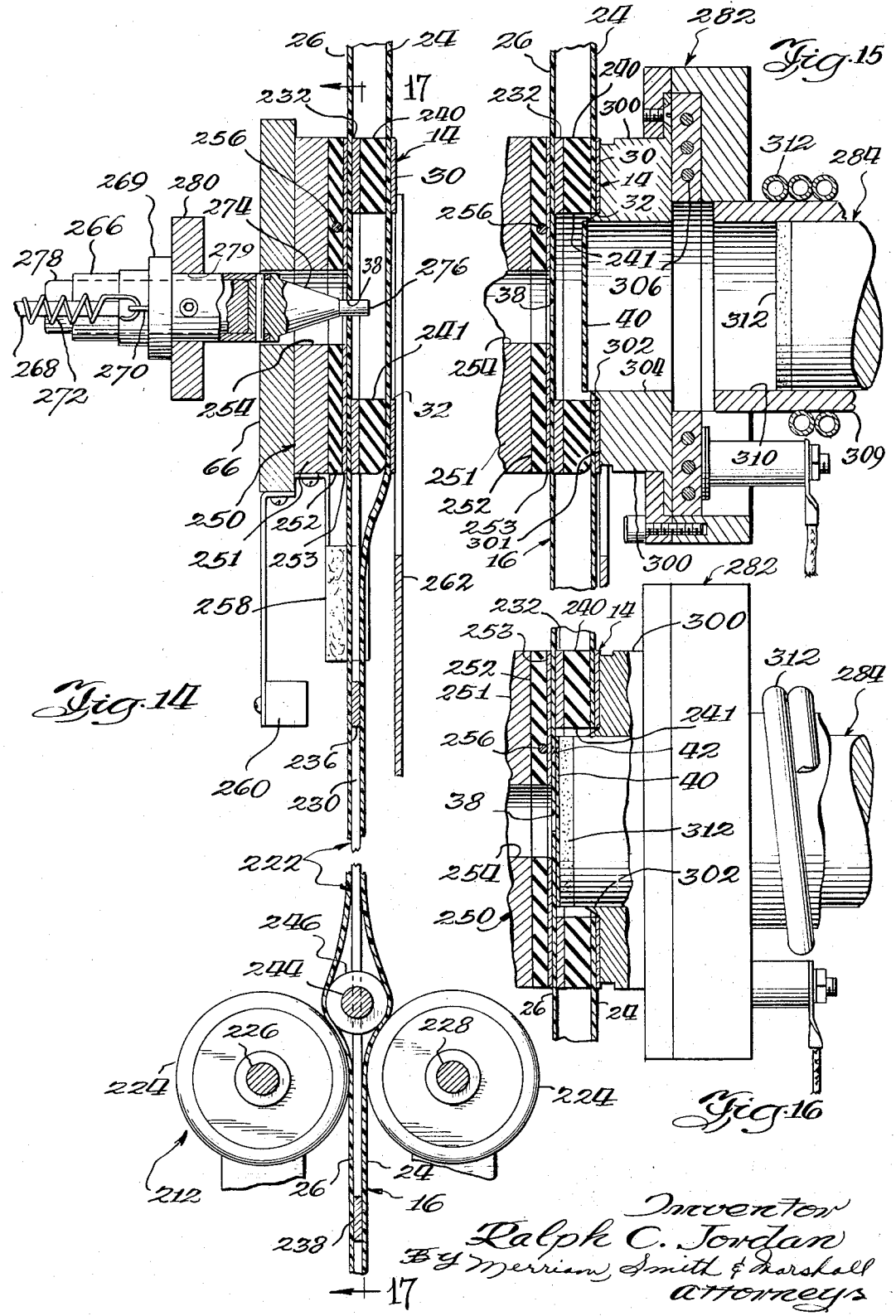

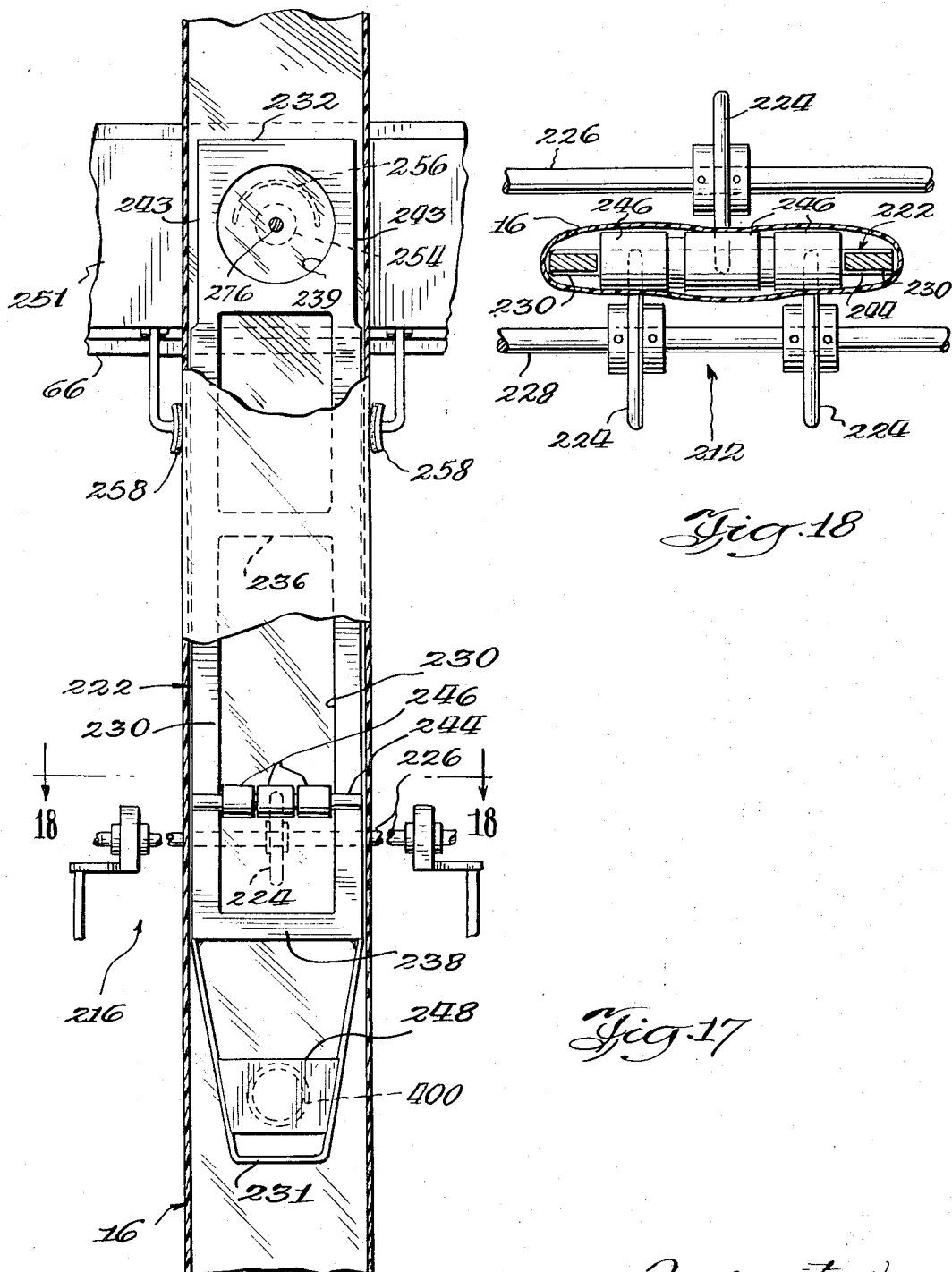

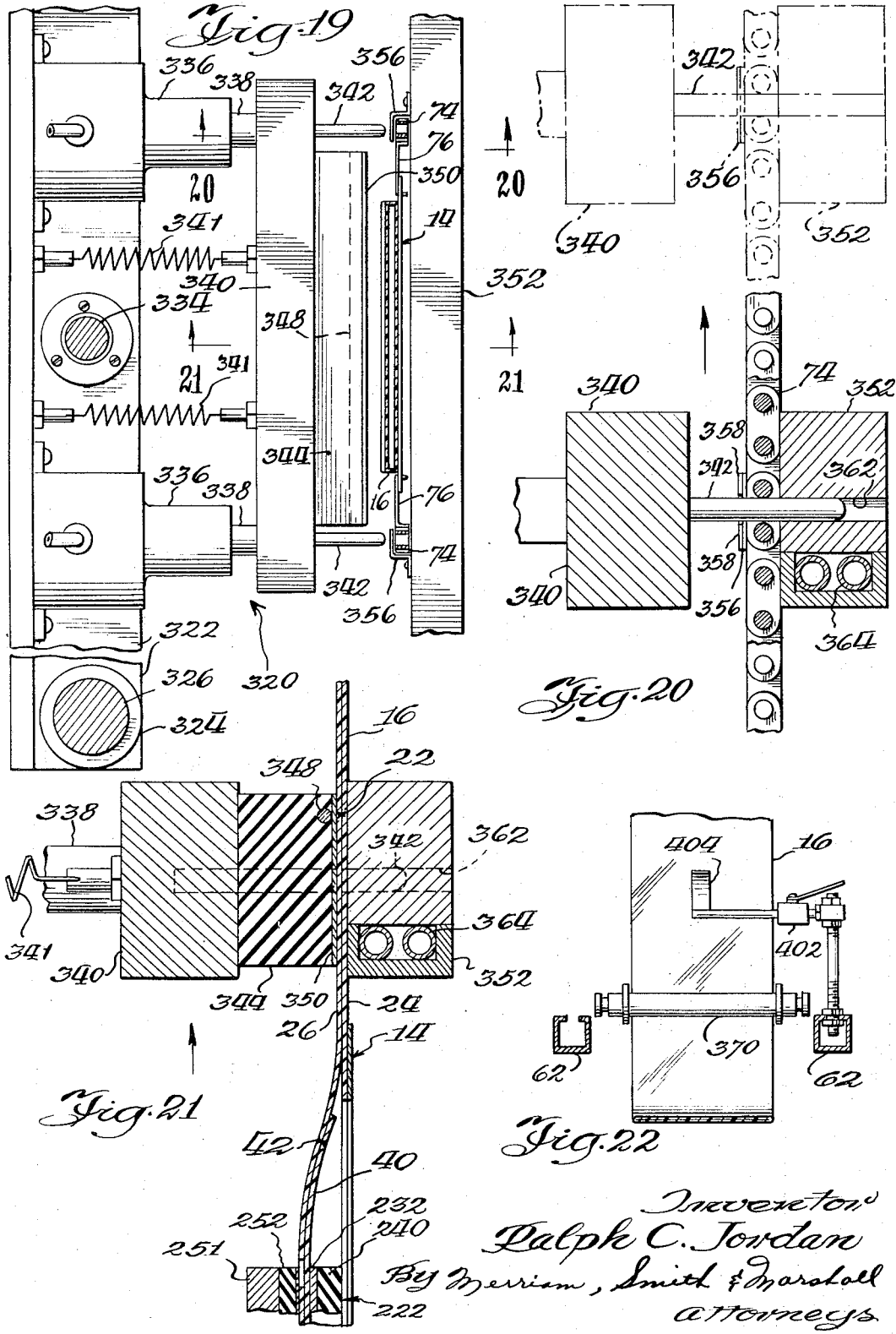

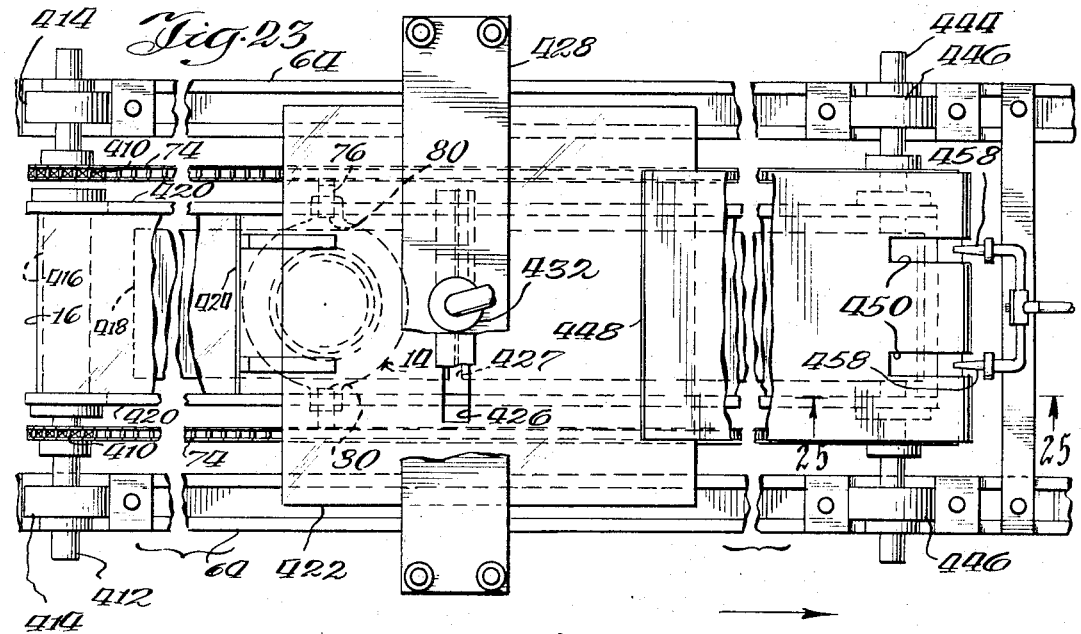
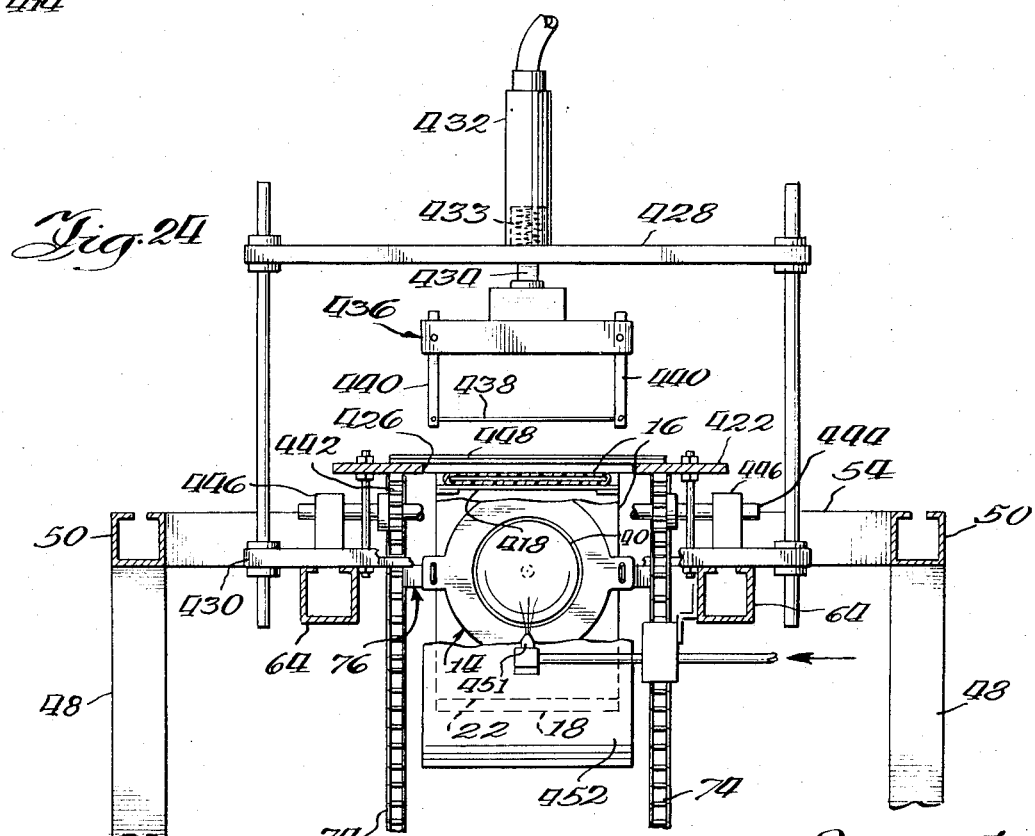

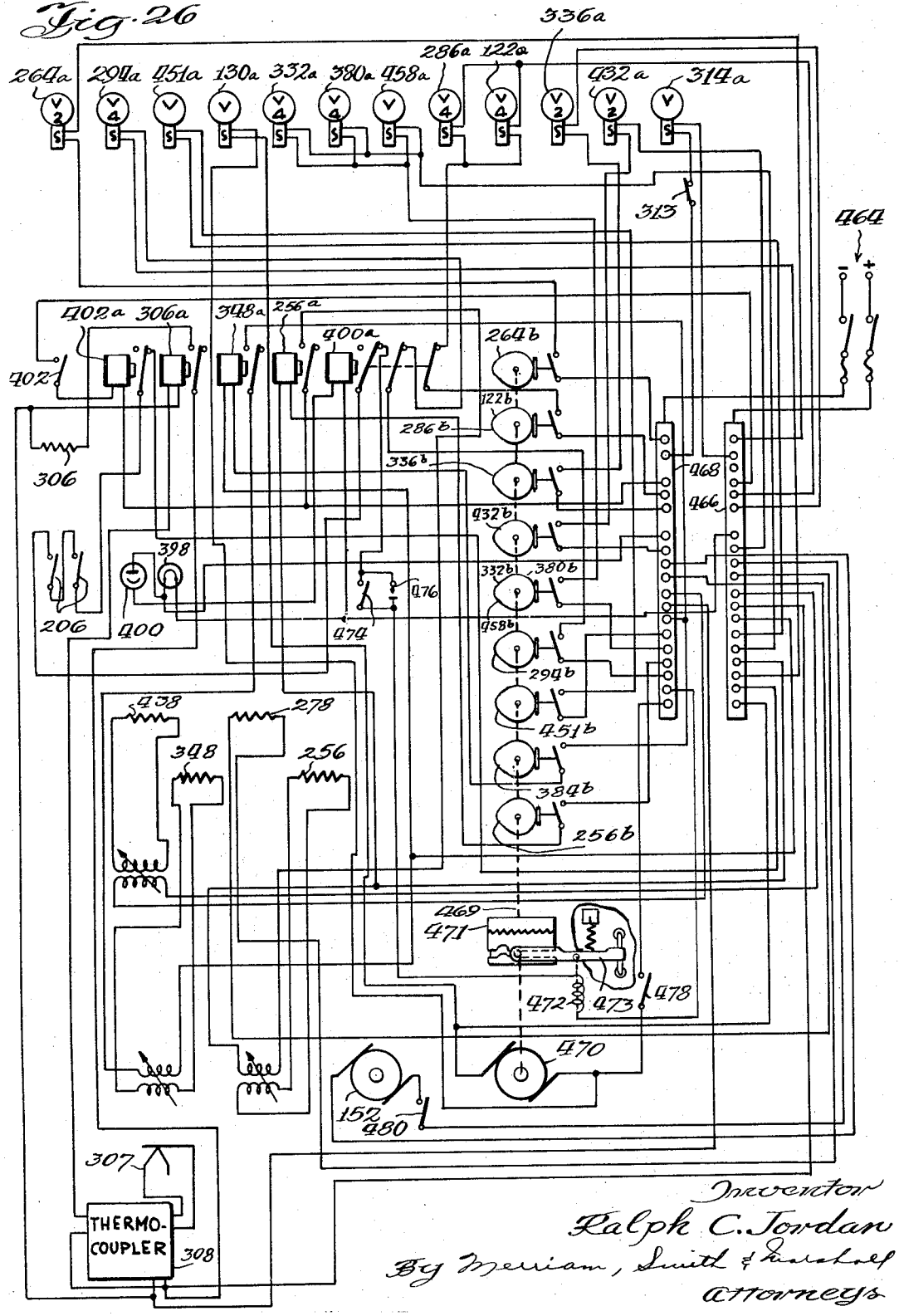

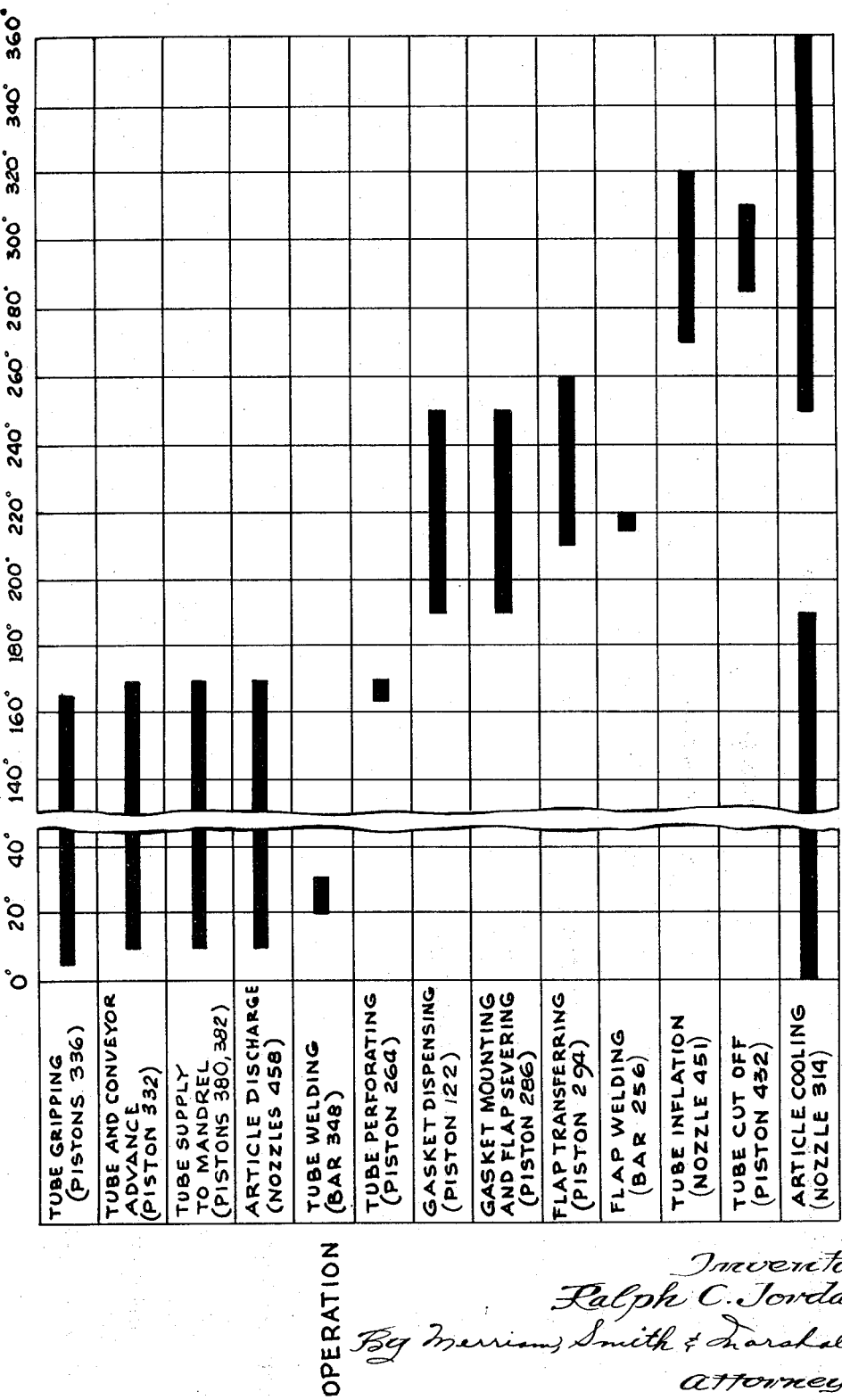

United States Patent Office 3,352,737
Patented Nov. 14, 1967

3,352,737
MACHINE FOR MANUFACTURING A COLOSTOMY DRAINAGE DEVICE
Ralph C. Jordan, Palos Hills, Ill., assignor to
The Marsan Manufacturing Co., Inc.
Filed Jan. 8, 1964, Ser. No. 336,478
11 Claims. (Cl. 156—514)

ABSTRACT OF THE DISCLOSURE

A colostomy drainage bag is continuously and economically fabricated on a machine which feeds a roll of lay-flat flexible plastic tubing to a plurality of stations which sequentially apply an annular gasket to one wall of the tubing, punch out the portion of the tubing wall encompassed by the gasket, and appply the punched-out portion to the opposite wall of tubing where it functions as a flap valve for an opening located in said opposite wall, the opening serving as a means through which a catheter can be inserted into the colon of the user of the bag without removing the bag. Finishing stations on the apparatus effect the sealing of the tubing and its severing to provide unit bags.

---

This invention relates to the manufacture of colostomy drainage devices and the like. More particularly, the invention relates to a machine for manufacturing drainage devices which have a flexible tubular body and a gasket thereon.

A widely used kind of colostomy drainage device is constructed of a flexible tubular body having an opening in the tube wall, and a gasket mounted on the body adjacent to the opening. The gasket is employed for holding the device against the body of the user while the stoma is received in the opening. The device may be supported on the user by a belt or other means, and it is especially advantageous to support the device by a belt placed around the user's body and attached at its ends to the gasket. The tubular body of the device is closed at one end, corresponding to its normally upper end in use, and the opposite, normally lower end may be open or closed, depending on the manner in which the device is to be used. The tubular body preferably is constructed of flexible thermoplastic sheet material or film, and the gasket preferably is constructed of cardboard. The preferred construction provides the advantages of economy, comfort, lack of bulk, and disposability, and the device functions efficiently and sanitarily.

The tubular body of one type of drainage device functions as a container for collecting the waste products. After each use, the device and contents are disposed of. Another type of device is employed in conjunction with irrigation of the colon. In this case, the tubular body of the device functions as a drain tube or conduit. The device then also includes a hole in the tube wall for insertion of a catheter tube through the device and into the colon, followed by introduction of liquid through the catheter tube. The catheter tube next is withdrawn, and the waste materials discharge into the body of the device and from there into a toilet bowl or a container. A valve flap is provided on the inner wall surface of the tubular body and over the catheter hole, and it prevents waste material from escaping through the hole at this time.

The drainage devices must be manufactured in large quantities in an efficient and reliable manner, so that they may be supplied to users at low cost. The present invention provides a machine which automatically and continuously produces the drainage devices in large quantities. The machine operates with the desired efficiency and reliability, and it produces drainage devices which are well and accurately made. Consequently, the drainage devices can be made available to users economically.

The new machine or components thereof may be employed for manufacturing the above and other types of drainage devices. The machine is particularly adapted for producing finished articles of the described colostomy irrigator device from raw materials which constitute continuous flexible tubing and a supply of gaskets.

A preferred embodiment of the new machine includes means for supplying flexible tubing and a succession of gaskets to an operating station. Means are provided at the operating station for perforating the tube wall to provide a catheter hole, and means are provided for mounting a gasket on the tubing opposite to the hole. Additional means sever a flap from the tube wall adjacent the gasket to provide a corresponding opening in the wall. Further means transfer the flap to the opposite inner wall surface and overlying the catheter hole for mounting the flap on the tube wall at this location, thereby providing a valve flap over the hole. Means are provided for removing the tubing and gasket thereon from the operating station, and for supplying additional tubing and a successive gasket thereto. Means are provided for thereafter sealing the tubing, severing individual articles therefrom, and discharging the articles as they are produced.

Important features of the invention include the provision of flap severing and flap mounting means in combination with gasket mounting means. An additional feature is the combination therewith of tube perforating means.

Another important feature is the provision of conveyor means for supporting individual gaskets successively thereon, for moving the gaskets to and from a station at which they are mounted on the tubing.

A further important feature is the provision of means for supporting the tubing for performing the several operations thereon, including a mandrel disposed internally of the tubing, and the combination of the tubing supporting means with the foregoing means.

An additional important feature is the provision of means for gripping and advancing the tubing and the combination thereof with tubing supply means, tubing supporting means, and conveyor means, and also with means for sealing the tubing.

Another feature is the provision of timed means for performing the manufacturing operations in timed relation and with several operations proceeding simultaneously, thereby achieving a high rate of continuous production of the drainage device articles.

The new machine produces high quality articles with relatively few rejects. The articles are accurately made and free of imperfections in the tubular body, in the valve flap and its mounting, and in the mounting of the gasket. The machine requires little attention by the operator.

These and other features, advantages, and functions of the invention will be apparent on reference to the specification and to the attached drawings illustrating a preferred embodiment of the invention, in which like parts are identified by like reference symbols in each of the views and in which:

FIGURE 1 is a side elevational and partly sectional view of the machine, with parts broken away;

FIG. 2 is a schematic representation of the machine as it is illustrated in FIG. 1, identifying the operations performed at several stations thereon;

FIG. 3 is a fragmentary perspective view, with parts broken away and in section, illustrating the progress of manufacturing following the operations performed at station 3 as identified in FIGS. 1 and 2;

FIG. 4 is a broken elevational view of a finished article of a colostomy irrigator drainage device;

FIG. 5 is a fragmentary longitudinal cross-sectional view of the article, taken on line 5—5 of FIG. 4;

FIG. 6 is an enlarged fragmentary elevational and longitudinal sectional view of the gasket supply assembly in the rear section of the machine, as viewed from the opposite side of FIG. 1 and taken substantially on line 6—6 of FIG. 7;

Figure 10:
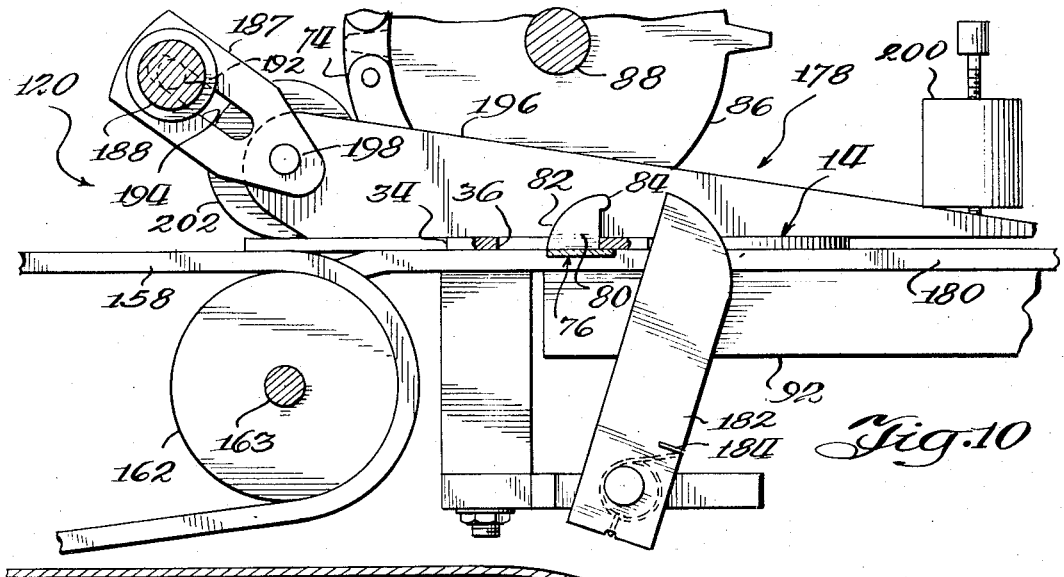
Figure 25:
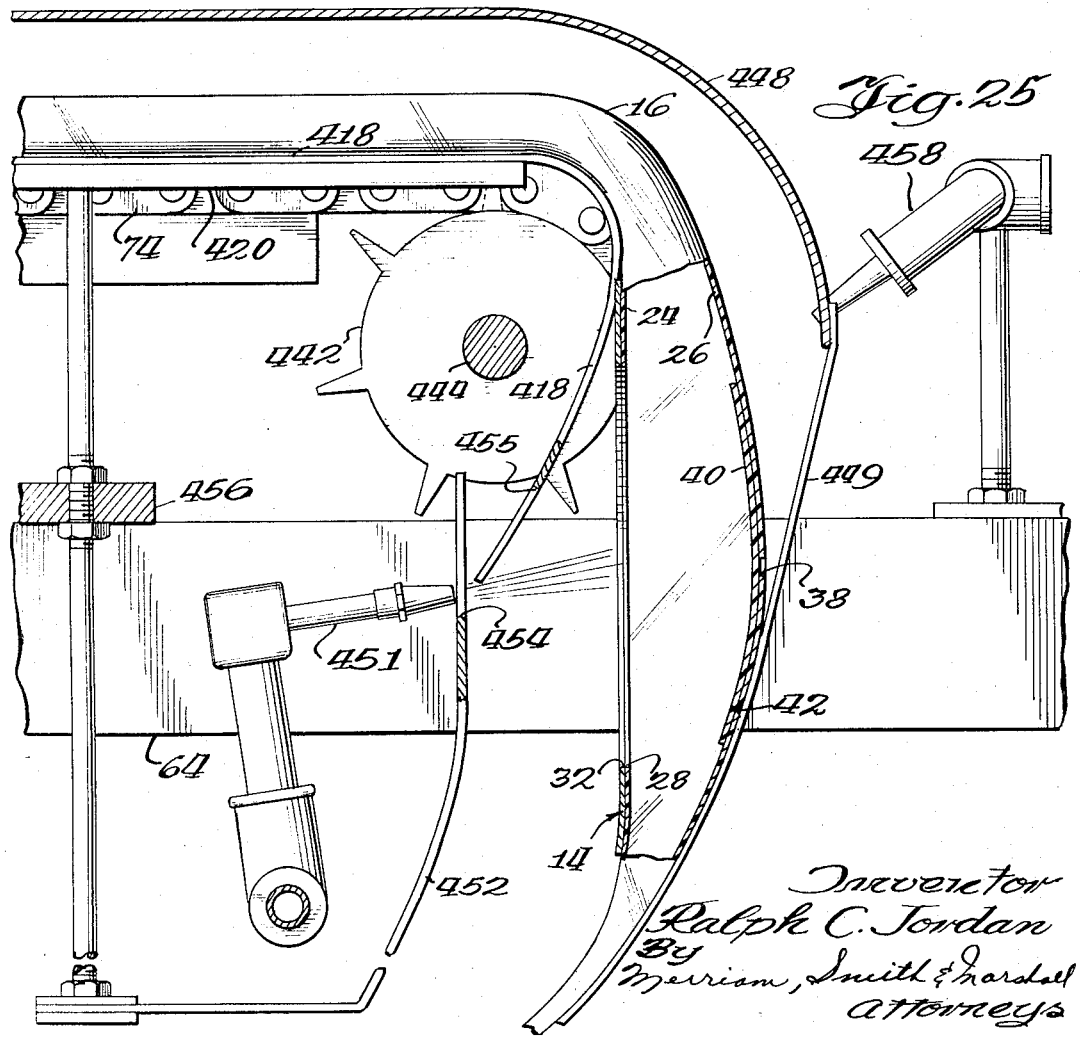

FIG. 7 is an enlarged fragmentary broken top plan view of the gasket supply assembly and inspection apparatus at stations 1 and 2, taken on line 7—7 of FIG 1 and as viewed from the opposite side, with parts removed;

FIG. 8 is a further enlarged broken fragmentary plan view of parts of the gasket supply assembly illustrated in FIG. 7, illustrating the operation thereof;

FIG. 9 is an enlarged fragmentary longitudinal sectional and elevational view of the gasket supply assembly, taken substantially on line 9—9 of FIG. 8;

FIG. 10 is a further enlarged fragmentary longitudinal sectional view of the gasket transferring and mounting apparatus in the supply assembly, taken substantially on line 10—10 of FIG. 7;

FIG. 11 is an enlarged fragmentary side elevational and partly sectional view of the front end of the machine, with parts broken away;

FIG. 12 is an enlarged fragmentary top plan view of apparatus located at station 3, taken substantially on line 12—12 of FIG. 1;

FIG. 13 is an enlarged broken fragmentary transverse elevational view taken on line 13—13 of FIG. 12, with parts broken away and in section, illustrating the conveyor means, tubing supporting means, and associated structure, bearing an unfinished article in the manufacturing stage shown in FIG. 3;

FIG. 14 is an enlarged fragmentary longitudinal sectional and elevational view of the perforating and welding apparatus, taken on line 14—14 of FIG. 12, and with parts broken away and in section, illustrating the perforating operation;

FIG. 15 is a view similar to FIG. 14 and illustrating the gasket mounting and flap severing and transferring apparatus in the next stage of manufacture;

FIG. 16 is a view similar to FIGS. 14 and 15, illustrating the position of the apparatus in the manufacture stage following that illustrated in FIG. 15;

FIG. 17 is a transverse sectional view taken substantially on line 17—17 of FIG. 14, illustrating the mandrel with its backing pad removed, and associated apparatus;

FIG. 18 is an enlarged cross-sectional view taken on line 18—18 of FIG. 17, illustrating means for supporting the mandrel;

FIG. 19 is an enlarged fragmentary top plan view of the tube gripping and sealing apapratus, taken on line 19—19 of FIG. 1;

FIG. 20 is a further enlarged fragmentary sectional view taken on line 20—20 of FIG. 19, illustrating connection of the gripping apparatus to the conveyor and their conjoint movement;

FIG. 21 is an enlarged fragmentary sectional view taken on line 21—21 of FIG. 19, illustrating the tube sealing means in operation;

FIG. 22 is an enlarged fragmentary sectional and elevational view taken on line 22—22 of FIG. 1, illustrating an inspection switch responsive to an absence of tubing at this location;

FIG. 23 is an enlarged fragmentary broken top plan view of the machine taken on line 23—23 of FIG. 1, illustrating the apparatus at tube cutting station 5 and article discharge station 6;

FIG. 24 is a fragmentary transverse sectional view taken on lines 24—24 of FIG. 1, illustrating the tube cutting apapratus and a tube inflation nozzle in operation;

FIG. 25 is a further enlarged longitudinal sectional view taken on line 25—25 of FIG. 23, illustrating the tube inflation nozzle in operation and the article discharge apparatus;

FIG. 26 is a circuit diagram for the machine, with components of the machine being illustrated schematically; and FIG. 27 is a timing chart for the machine.

Referring to the drawings, the new machine continuously produces individual articles of a colostomy drainage device by a series of operations performed at successive operating stations on the machine. The stations are identified as numbers 1 through 6, and the operations performed thereat are denoted in FIG. 2.

In the preferred illustrative embodiment of the invention, the machine produces as a finished article ready for use, the colostomy irrigator device 10 illustrated in FIGS. 4 and 5. The device includes a flexible tubular body 12 in a substantially flat condition, and a circular annular retainer gasket 14 attached or affixed to the outer wall surface wall surface adjacent one end 18 thereof. The body 12 represents a length severed from a flexible tubing 16 (FIG. 3), which preferably is formed of polyethylene or other liquid impermeable preferably thermoplastic tubular sheet or film material. The end 18 of the device preferably is sealed, and the opposite end 20 is open. Preferably, the seal is formed by a transverse weld 22 which unites opposite sides or side walls 24 and 26 of the flat tubing.

One side 24 of the tubular body 12 is provided with a circular wall opening 28 therein. The gasket includes a ring portion 30 defining an opening 32 registering with the wall opening 28 and being about the same size or slightly larger in diameter. The gasket also includes a pair of diametrically opposed slotted tabs or wing portions 34, and a transverse slot 36 is provided in each tab. The ring portion 30 is secured to the body around the wall opening 28 to provide a leakproof joint therearound, and the tabs 34 extend freely from the ring portion and are otherwise unattached to the body. The gasket is secured to the body by suitable adhesive means. In a preferred embodiment, the gasket is formed of a relatively stiff material such as cardboard. One surface of the gasket ring 30 is provided with a thin polyethylene coating or film adhered thereon. The coating is fused to the outer surface of the tubular body 12, thereby intimately joining the gasket to the body.

The side 26 of the body 12 opposite to the side 24 bearing the gasket is provided with a relatively small catheter hole or perforation 38 registering with the opposite wall opening 28 substantially centrally thereof. A valve flap 40 in the form of a circular disk is mounted over the catheter hole on the inner surface of the tubing wall. A portion of the flap is affixed to the wall by means of an arcuate weld 42. The joined portion of the flap normally constitutes about the upper one-half of the flap located above the hole in use. The lower portion of the flap depends freely from the welded portion, with the flap overlying the hole to provide a valve closure therefor.

The valve flap 40 constitutes a portion of the tubing which has been severed from the opposite side 24 bearing the gasket, when the device is constructed according to the invention. The wall opening 28 is formed by severing the flap from the tubing wall in the region bounded by the gasket, so that the flap corresponds in size to the opening but is smaller in diameter owing to the particular manner of severing which is employed in the illustrative preferred embodiment. The flap when mounted on the side 26 substantially registers with the wall opening 28 but may shift to a small extent in the process of transferring it from one side to the other.

The irrigator drainage device 10 is intended for use in irrigating the colon of a colostomy patient. A belt may be placed around the patient's body and clipped to the gasket 14, employing the tab slots 36 to make the connection. The stoma is inserted through the gasket and wall openings 32 and 28 and into the tubular body 12, and the gasket lies adjacent to the body of the patient. A suitable catheter tube connected to an enema bag is inserted through the catheter hole 38 in the side 26, which then constitutes the outer side or wall of the device. The catheter tube raises the valve flap 40 and is inserted through the wall and gasket openings 28 and 32, and then into the stoma, following which water is conducted through the tube into the colon. The catheter tube is removed, whereupon the valve flap returns to its normal position overlying the catheter hole. The contents of the colon discharge through the stoma into the body 12 of the device and out the open bottom end 20 located in a toilet bowl or other container. The valve flap prevents leakage from the catheter hole.

The drainage device 10 is completely constructed in fully automatic operation by the new machine, employing continuous flexible tubing 16 and gaskets 14 as the starting materials. Coated gasket material suitable for affixing to plastic sheet materials and continuous thermoplastic tubing are available as articles of commerce.

The operations performed on the machine at the successive stations are as follows, with particular reference to FIGS. 1 and 2: Gaskets 14 are mounted successively on a conveyor at station 1. The conveyor travels from station to station around the machine. Each gasket 14 is conveyed from station 1 to station 2, where it is inspected for proper alignment. The gasket then is conveyed to station 3, and the tubing 16 is brought together with the gasket at this station. There, the tubing is perforated to provide the catheter hole 38 (FIGS. 3–5). The gasket is attached to the tubing, and a valve flap 40 is severed from one side 24 of the tubing and transferred to the other side 26 thereof, over the catheter hole. The flap is welded to the latter side. At this time, manufacture of a device has taken place to the extent illustrated in FIG. 3.

The gasket and the tubing next are conveyed together to station 4, during which travel the tubing is gripped and welded to provide the transverse sealing weld 22. The tubing is gripped briefly at station 4 while being perforated at station 3. The gasket and attached tubing at station 4 next are conveyed to station 5, where the tubing is cut slightly in advance of the sealing weld 22, to sever a preceding article of the drainage device 10. The gasket and attached tubing next are conveyed to station 6. The cutting operation at station 5 severs the length of tubing between stations 5 and 6, producing a finished article of the drainage device 10. The article then is discharged from the conveyor at station 6 to a collector for the articles, while the conveyor is advanced one station. The next conveyor movement completes one circuit of conveyor travel, returning the conveyor section which bore the initial gasket to station 1.

Referring to FIGS. 1, 12 and 24, the machine includes a generally rectangular supporting frame 44 constructed of pairs of spaced upright front and rear end support bars 46 and 48, respectively. The uprights are connected adjacent their upper and lower ends by longitudinally extending horizontal spaced pairs of bars 50 and 52, respectively. The uprights are also connected by transverse bars 54 and 56 adjacent their respective upper and lower ends, and by intermediate transverse bars 57 near their lower ends. Spaced pairs of intermediate upright bars 58 and 60 extend between the upper and lower longitudinal bars 50 and 52 and are secured thereto. A pair of spaced parallel horizontal longitudinal mounting bars 62 are secured on the intermediate transverse bars 57 and provide a lower platform on the frame. A pair of spaced parallel longitudinal horizontal mounting bars 64 are mounted on the upper transverse bars 54 and provide an upper platform on the frame. A transverse horizontal mounting bar 66 is mounted on one pair of intermediate uprights 58, and a second transverse horizontal mounting bar 68 is mounted on the remaining pair of intermediate uprights 60. The transverse mounting bars 66 and 68 are spaced above the lower longitudinal mounting bars 62 in the lower section of the frame.

Referring to FIGS. 1 and 6–10, a quantity of gaskets 14 is contained in a gasket supply assembly 70 on the lower longitudinal mounting bars 62 adjacent the rear end of the machine. A roll 72 of flat continuous flexible tubing 16 is mounted on the lower mounting bars 62 at the front end of the machine. The gaskets are dispensed individually from the supply assembly and are mounted successively on a pair of spaced parallel endless conveyor chains or elements 74 at station 1. The conveyor chains are mounted on the frame 44 for conjoint movement along a fixed closed path around the frame, ultimately returning to station 1. The conveyor chains are moved intermittently at timed intervals by means described subsequently.

Gasket supporting lugs 76 are mounted on the conveyor chains 74, there being a total of seven lugs on each chain equidistantly spaced therearound. The lugs are mounted on the chains in pairs of opposed lugs which extend laterally towards each other for mounting one gasket on each pair to extend between the chains. Each lug includes a laterally extending bar 78 mounted on a chain link, and a perpendicularly outwardly extending finger 80 (see FIGS. 7 and 10). The finger has a forwardly curved rear edge 82 and an outer forwardly extending projection 84. The width of the finger is about one-half of the length of a gasket slot 36. The fingers of each pair of lugs are received in the respective slots of a gasket in mounting the gasket on the conveyor.

The conveyor chains are trained on a pair of sprockets 86 mounted on a shaft 88. The shaft is journaled in bearings 90 which are mounted on the longitudinal mounting bars 62 at station 1. The chains travel downwardly from station 6 to station 1, at which point they change direction and travel in horizontal planes. The chains travel above a pair of conveyor tracks 92, which are supported by transverse bars 94 secured to the longitudinal mounting bars 62 by means of brackets 96.

The gasket supply assembly 70 includes a gasket holder 98 constructed of a pair of spaced upstanding guide channels 100 which face each other, mounting brackets 102 securing the channels to a base plate 112, an arcuate strap 104 joining the upper ends of the channels, and inclined channel braces 106 connected to the base plate. The base plate is mounted on a pair of base bars 116 parallel to the longitudinal mounting bars 62 and secured thereto for mounting the base plate in a horizontal position extending between the mounting bars. Each guide channel 100 includes a pair of inwardly extending flanges 108 which receive the gasket tabs 34 between them to align the gaskets in a stack thereof. A weighted follower 110 is also received between the channels on top of the stack. The channels are supported by the brackets 102 a short distance above the base plate 112, leaving a space 114 thereunder (FIG. 9) about the thickness of a gasket 14.

The gasket supply assembly 70 also includes dispensing apparatus 118 and transfer and mounting apparatus 120. The dispensing apparatus includes a double acting pneumatic dispenser piston 122 mounted on the base plate 112. The piston is provided with fittings 124 at opposite ends of its cylinder 126. The fittings are connected to a conventional solenoid-operated four-way air valve 122a, as schematically illustrated in FIGS. 6 and 26, for reciprocating the piston rod 128 between opposite ends of the cylinder. The valve and other valves subsequently described are connected to an air main 130 leading to a source of compressed air, not shown, and provided with a solenoid valve 130a in the line to the source.

The piston rod 128 is secured to an assembly of a slide block 132 and a slide plate 134 secured thereto, the assembly being longitudinally slidable on the base plate 112. The plate terminates in a pair of spaced parallel dispensing blades 136 (FIGS. 7 and 8). The slide block is reciprocally movable between an outer abutment 138 and an inner abutment 140 adjacent the holder 98, both abutments being longitudinally adjustably mounted on the base plate. The inner abutment includes a stop bar 142, an arcuately recessed mounting plate 144 adjacent the stack of gaskets 14, and a shock absorbing pad 146 therebetween. The stop bar is removable and may vary in thickness for adjusting the stroke length. The inner abutment 140 also serves as a guide for the dispensing blades 136, which slide along opposite sides of the abutment. A pair of holder and guide plates 148 are secured on the base plate 112, and they overlie the sides of the slide plate 134 and provide additional guides therefor.

As seen in FIGS. 6, 8 and 9, movement of the piston rod 128 and of the slidable members in the direction of the holder 98 causes the dispensing blades 136 to enter the openings 114 beneath the channels 100 and engage the lowermost gasket 14 in the stack. Each blade abuts on a side of one of the gasket tabs 34 and displaces the gasket in the direction of the transferring and mounting apparatus 120, which picks up the gasket and removes it from beneath the stack. When the piston rod 128 and the slidable members are moved away from the gasket holder, a successive gasket drops into position on the base plate 112.

The transferring and mounting apparatus 120 includes a gasket transfer assembly 150 which delivers the gaskets dispensed from the holder 98 to station 1, where they are mounted on the conveyor chains 74. The transfer assembly includes a motor 152 drivingly coupled by a belt 153 to a transverse shaft 154 mounted for rotation on the base bars 116. Two driven pulleys 156 are keyed to the shaft in spaced apart relation, and a conveyor belt 158 is trained on each pulley. A pickup wheel 160 having a peripheral friction surface is keyed to the shaft about midway between the pulleys, and the wheel has about the same diameter as the assembled pulleys and belts. The belts are also trained on a pair of idler pulleys 162 keyed to a rotatable shaft 163 mounted adjacent to the conveyor chains 74. Additional upper and lower pairs of idler pulleys 164 and 166, respectively, support the belts between the driven pulleys 156 and the idler pulleys 162. Two pinch rolls 168 engage the belts 158 on the driven pulleys 156. The pinch rolls are suspended from shafts 170 journaled in bearings 172 on the respective base bars 116. A lever 174 is also secured to each shaft and connected to a tension spring 176, serving to bias the pinch roll against the belt.

When a gasket 14 is moved from beneath the channels 100 by the dispensing blades 136, the ring 30 of the gasket is engaged adjacent to the tabs 34 by the belts 158 and the pinch rolls 168, traveling therebetween. The central portion of the ring 30 is also engaged by the pickup wheel 160. With the drive motor 152 in operation, the gasket is removed by the belts and the pickup wheel and transferred to a position adjacent to the conveyor chains 74 for mounting the gasket thereon.

A mounting assembly 178 is provided at the discharge end of the transfer assembly 150 adjacent to a stationary loading position at station 1 assumed by successive gasket supporting lugs 76 on the conveyor chains. The mounting assembly includes a shelf 180 disposed between the chains adjacent the fingers 80 of opposed lugs. As seen in FIG. 10, stops 182 are pivotally mounted adjacent opposite sides of the shelf, and they are biased by springs 184 towards the transfer assembly 150 and a gasket being delivered thereby.

A pair of brackets 187 are mounted respectively adjacent the outer sides of the discharge end of the belts 158. Each bracket is mounted on a holder 188 in turn mounted on a bar 190 extending from one of the base bars 116. Each bracket is adjustably secured on a stud 192 on the holder, the stud being received in a slot 194 in the bracket. A pair of restraining arms 196 is pivotally mounted above the shelf 180 on a rod 198 mounted on the brackets and extending therebetween. A weight 200 is mounted on the outer end of each arm. Two pinch rolls 202 are rotatably mounted on the rod to engage the respective belts 158 above the idler pulleys 162.

When a gasket is transferred to the mounting assembly 178 by the belts 158, it passes between the pinch rolls 202 and the belts, and between the restraining arms 196 and the shelf 180. As the gasket tabs 34 engage the curved rear edges 82 on the supporting lug fingers 80, the tabs ride over the fingers. At the same time, the restraining arms pivot upwardly while bearing on the gasket under the force of the weights 200. The spring-biased stops 182 limit the forward movement of the gasket. The lug fingers enter the tab slots 36, to mount the gasket on the lugs. When the conveyor chains 74 are moved thereafter, the stops yield to the force imparted to the gasket by the lugs and permit the gasket to be conveyed thereover from the shelf 180 to station 2. The gasket is supported by the lugs, and auxiliary support is provided by a longitudinal bar 204 midway between the chains and extending from station 1 to station 2.

Two mercury switches 206 (FIG. 7) are mounted on the transverse bar 94 adjacent respective conveyor chains 74 at a stationary inspection position at station 2 assumed by successive gasket supporting lugs 76. Each switch has a wire trip arm 208, and the arms extend into the movement path of the gaskets 14. Each arm is arranged to be engaged by one of the tabs 34 on a gasket at the station. If the gasket is in place on the lugs 76, the arms are tripped and the switches are held closed while the current operating cycle is completed, and operation of the machine continues thereafter. If the gasket is not in place on either or both of the lugs, as illustrated in phantom lines in FIG. 7, it fails to trip one or both of the switches, and operations are discontinued after completing the operational cycle in progress.

The gasket next is conveyed to station 3. Referring to FIGS. 1, 11 and 12, the conveyor chains 74 are trained over large sprockets 210 between stations 2 and 3, to change from horizontal to upward vertical movement. Tubing support apparatus 212 is provided for supporting the flexible tubing 16 adjacent to the conveyor path and extending upwardly therealong to station 3 in register with the space between the conveyor chains 74. Perforating and flap welding apparatus 214 is supported by the transverse mounting bar 66 adjacent the outer side 26 of the tubing at station 3. Gasket attaching, flap severing and flap transfer apparatus 216 is supported by the transverse mounting bar 68 on the inner side 24 of the tubing and in spaced relation thereto and to the chains 74. The latter apparatus is also supported by uprights 218 mounted on the longitudinal mounting bars 62, the members being joined by hinges 220 for lowering the uprights thereby enabling the apparatus to be lowered for access to its parts.

Referring also to FIGS. 13–18, the tubing support apparatus 212 includes an elongated mandrel or arbor 222 disposed internally of the tubing 16 therealong, and externally mounted mandrel supporting rollers 224. The rollers are mounted on rods 226 and 228 on opposite sides of the tubing, and the rods are mounted on the machine frame 44. The mandrel includes a generally rectangular frame constructed of two spaced parallel elongated metal side bars 230 and two spaced parallel crossbars 236 and 238. The frame is bridged at one end by a convergent wire nose member 231 and at the opposite end by an integral rectangular backing plate 232. The frame, particularly the crossbar 236 thereof, preferably is constructed of paramagnetic material. The backing plate is provided with a central circular die opening 239. A rectangular backing pad 240 is secured to one side of the backing plate. The pad is a firm resilient structure and, preferably, is formed of silicone rubber. It has a central die opening registering with the plate opening 239, to provide a circular die opening 241 extending through the mandrel between opposite sides thereof. A plurality of nibs 242 are formed on the outer surface of the backing member and surround the die opening. Recessed side edges 243 are provided on the mandrel along the backing section. A rod 244 is secured to the side bars and extends transversely therebetween adjacent the nose end of the mandrel. Three rollers 246 are mounted on the rod between the side bars. A light shield or target 248 in the form of a metal plate extends between the sides of the nose member 231 and is secured thereto.

The width of the mandrel 222 is slightly less than the width of the flexible tubing 16 when flattened, permitting the tubing to move over the mandrel therein. The additional thickness provided by the backing pad 240 is compensated for by the recessed edges 243. The tubing is supported with the mandrel therein by inserting the nose member 231 between the external supporting rollers 224, until the mandrel rollers 246 are seated thereon and engaged thereby. The tubing passes between the external rollers and the mandrel rollers, and the weight of the mandrel produces substantial frictional engagement between the rollers and the opposite sides 26 and 24 of the tubing.

The mandrel and the tubing thereon are supported with the backing plate 232 adjacent a backstop 250 mounted on the transverse mounting bar 66. The backstop includes a plate 251 faced with a non-conducting firm resilient pad 252 having a covering layer 253 thereon. Preferably, the pad is constructed of silicone rubber, and the covering layer is a fabric formed of Teflon and glass fibers. A perforating opening 254 extends through the mounting bar and the backstop. A substantially semicircular electrical impulse welding bar or strip 256 is mounted in the backstop pad above the perforating opening and adjacent to the covering layer.

Two laterally adjustable chain guides 257 are mounted on the backstop plate 251 by screws 259 extending through adjustment slots 261 in the guides. Two edge guides 258 are mounted on the backstop plate and depend therefrom. The chain guides engage the conveyor chains 74 and the edge guides engage the edges of the mandrel and the tubing thereon to align the gasket 14 and the mandrel with the backstop pad 252. A permanent magnet 260 is mounted on the mounting bar 66 and depends therefrom opposite to the intermediate crossbar 236 on the mandrel. The magnet pulls the backing plate 232 and the tubing side 26 thereon against the backstop. A forked guide member 262 mounted on the frame engages the gasket tabs 34 carried by the lugs 76 to hold the gasket on the face of the backing pad 240 with the inner side 24 of the tubing therebetween.

The mandrel die opening 241 registers with the perforating opening 254 and with the welding bar 256. The perforating opening is centrally disposed with respect to the die opening, and the welding bar registers with the upper one-half of the die opening. The gasket 14 surrounds the die opening, and the gasket opening 32 registers with the die opening, the perforating opening, and the welding bar.

Perforating apparatus is supported by the mounting bar 66 and extends outwardly therefrom. It includes a single acting perforator piston 264 (FIG. 12) on a supporting member 265, a reciprocable hollow perforating head 266, and a yoke 268 coupling the piston rod and the head. A stop ring 269 is secured to the head, and a bar 270 is secured to the ring and extends outwardly therefrom. The supporting member 265 and the bar are interconnected by return springs 272. The head is provided with a conical nose 274 (FIG. 14) terminating in a small cylindrical punch member 276. An electric heater cartridge 278 is inserted in the perforating head, and it keeps the nose portion sufficiently hot to melt or fuse the thermoplastic material of the tubing 16.

The perforator piston 264 is connected to the air main through a solenoid-operated two-way valve 264a (FIG. 26) for moving the perforating head 266 in the direction of the tubing 16 when the valve is operated. The head moves in a corresponding opening 279 in a guide plate 280 and into the perforating opening 254. The hot punch member 276 contacts the tubing, melts or softens the plastic tubing and punches the catheter hole 38 therein, as illustrated in FIG. 14. The inner and outer sides 24 and 26 of the tubing are spaced apart a distance equal to the thickness of the mandrel backing section, and the tubing is held taut over the mandrel, as subsequently described. The movement of the head is limited by engagement of the stop ring 269 with the guide plate 280, so that only the outer side is perforated. The air valve 264a next is operated to release the pressure on the piston, and the return springs 272 function to withdraw the perforating head. Melted plastic accumulates on the punch member 276 and drops off or is removed manually. If desired, mechanical cleaning means (not shown) may be provided.

After the catheter hole 38 is formed in the outer side 26 of the tubing, the gasket 14 is attached or affixed to the inner side 24, and the valve flap 40 is severed therefrom and transferred to the outer side. The apparatus performing these functions is seen most clearly in FIGS. 12, 15 and 16. It includes an annular die 282 mounted for reciprocation to and from the mandrel 222, and a cylindrical plunger 284 movable therewith and also mounted for reciprocation therethrough. A double acting die piston 286 is mounted on a fixed supporting frame 288. The piston is operated by a solenoid-operated four-way valve 286a (FIG. 26) connected to the air main. The die and the piston rod 290 are interconnected by rods 292 for reciprocating the die. A double acting plunger piston 294 is secured to the rods 292 and movable with the die. The plunger piston is operated by a solenoid-operated four-way valve 294a (FIG. 26) connected to the air main. The plunger piston rod 296 is connected to the plunger 284 by rods 298 for reciprocation of the plunger together with the die and also independently within the die.

The die includes an annular pressure plate 300 having a flat annular surface 301 which faces the mandrel. An annular severing edge 302 is integral with the pressure plate radially inwardly thereof, and the edge protrudes from the plate surface towards the mandrel. The die has a cylindrical bore 304 which is encircled by the severing edge. An electrical resistance heating element 306 is mounted within the die adjacent the pressure plate and severing edge. As schematically illustrated in FIG. 26, a thermoelement 307 is provided in the die and a thermocoupler 308 is connected thereto and to the heating element for regulating the temperature of the die. A circular tubular guide 309 is mounted on the die, and it has a bore 310 registering with the die bore 304. A cooling coil 312 is provided around the plunger guide for circulating a cooling fluid such as water therearound. The plunger 284 is faced with a firm resilient pad 312 preferably formed of silicone rubber. The plunger is movable through the die bore 304 and therebeyond in the direction of the mandrel.

As illustrated in FIGS. 14–16, the gasket 14 is supported by the conveyor in register with the backing pad 240 around the die opening 241, and the periphery of the gasket opening 32 substantially coincides or is aligned with the periphery of the die opening. The gasket is positioned between the backing pad and tubing thereon, and the heated die 282. The pressure plate 300 registers with the gasket ring 30 and also with the backing pad around the die opening. The severing edge 302 registers with the gasket opening 32 and with the die opening. The die bore 304 and the plunger guide bore 310 register with the die opening 241, the backstop opening 254, and the welding bar 256. The plunger 284 faces the perforating head 266, and the catheter hole 38 is formed substantially axially of the plunger.

Following perforation of the tubing as illustrated in FIG. 14, the die piston 286 and the plunger piston 294 are operated successively to perform the successive operations illustrated in FIGS. 15 and 16. When the die piston is actuated, the pressure plate 300 is moved against the gasket 14 while the severing edge 302 contacts the inner tubing side 24 in the region bounded by the gasket. The die being heated, the gasket and the tubing are heated while they are pressed against the backing pad 240, thereby fusing the plastic coating on the outer face of the gasket to the plastic tubing. The hot severing edge softens and severs the tubing therearound to form the circular flap 40, as illustrated in FIG. 15. In rapid succession, the plunger piston is actuated to move the plunger 284 against the flap and transfer it through the die opening 241 to the inner surface of the outer tubing side 26, as illustrated in FIG. 16. The welding bar 256 is energized cooperatively with the plunger movement to fuse the outer side to the flap, forming the weld 42. The fabric layer 253 over the welding bar localizes the heat to produce a clean sharp weld. The flap is reliably and accurately secured over the catheter hole 38 in this manner, with the upper portion being welded to the tubing and the lower portion being free.

The die piston 286 is operated to withdraw the die 282 and the plunger 284 together. Shortly thereafter, the plunger piston 294 is operated to withdraw the plunger from the die bore 304. At this time, manufacture has progressed to the extent illustrated in FIGS. 3 and 13.

As seen in FIG. 1, a microswitch 313 is mounted on the die piston 286, and it is actuated upon return movement of the connecting rods 292. The switch controls a solenoid valve 314a (FIG. 26) in a line from the air main to a cooling nozzle 314 mounted below the gasket attaching apparatus 216 and directed towards the tubing and the gasket thereon. A stream of air is directed against the gasket and also through the gasket opening into the tubing, for cooling the fused plastic material. Air flow through the tubing is checked at the lower end of the mandrel 222 by opposed felt members 316 which hold the sides of the tubing together between them.

Referring to FIGS. 1, 11 and 19–21, tube gripping apparatus 320 is mounted for reciprocation between stations 3 and 4, the respective positions being shown in full and phantom lines in FIG. 1. The apparatus includes a transverse gripper mounting bar 322 and a pair of bearings 324 secured thereto at opposite ends thereof. Two spaced parallel vertical slide rods 326 are mounted at their opposite ends on the longitudinal mounting bars 62 and 64 and forwardly of the conveyor chains 74. The rods extend through the bearings, and the gripper mounting bar thereby is mounted for reciprocation between upper and lower positions. Upper collars 328 are secured to the rods to limit the upward movement of the mounting bar at station 4, and lower collars 330 are secured to the rods to limit the downward movement of the bar at station 3. At station 3, the mounting bar is located above the perforating and welding apparatus 214. The gripping apparatus is reciprocated by a double acting gripper piston 332 mounted on the upper longitudinal mounting bar 64. The piston rod 334 extends downwardly therefrom and is secured to the gripper mounting bar 322. The piston is operated by a solenoid-operated four-way valve 332a (FIG. 26) which is connected to the air main.

Two single acting gripping head pistons 336 are secured to the gripper mounting bar 322 and extend towards the conveyor chains 74. The pistons are operated by a solenoid-operated two-way valve 336a (FIG. 26) connected to the air main. The piston rods 338 are connected to a backing plate 340 located adjacent to the outer side of the conveyor chains 74. The gripper mounting bar and the backing plate are interconnected by tension springs 341. Two locking pins 342 are mounted on opposite ends of the backing plate and extend towards the conveyor chains 74 in alignment therewith. An outer gripping head 344 is mounted on the backing plate between the locking pins. The head is constructed of firm resilient insulating material such as silicone rubber. An elongated electrical impulse resistance welding bar or strip 348 is mounted in the insulating material adjacent the face of the head, and it extends horizontally thereacross. The head is faced with a thin layer 350 of Teflon-glass fiber fabric.

An inner gripping head 352 is located on the opposite side of the conveyor chains 74 and is secured to the gripper mounting bar 322 by tie rods 354. Two transversely spaced keeper brackets 356 are mounted on the inner head, and the chains 74 respectively are received and guided by the brackets adjacent the head. As seen in FIG. 20, each bracket includes two laterally extending prongs 358 on opposite sides of the axis of one of the locking pins 342. The brackets extend inwardly over adjacent links of the chains and guide the locking pins through the links. Holes 362 are provided in the inner head and receive the pins therein. A cooling coil 364 is mounted in the inner head for circulating a cooling fluid therethrough to prevent temperature buildup.

The gripping apparatus 320 is at station 3 at the time the die 282 is withdrawn following completion of the gasket and flap affixing operations, as illustrated in full lines in FIG. 1. The gripping head pistons 336 next are operated to cause the locking pins 342 to engage the conveyor chains 74 and the inner gripping head 352, as illustrated in FIGS. 20 and 21. The outer and inner sides 26 and 24 of the tubing 16 are clamped together by the outer and inner gripping heads 344 and 352, respectively, a short distance above the gasket 14 attached to the tubing. At this time, the gasket is supported by the conveyor lugs 76, and the lugs also provide support for the attached tubing. The tubing is also connected in fixed position relative to the conveyor chains by the gripping apparatus. The gripper piston 332 next is operated to move the gripping apparatus upwardly, causing the tubing, the conveyor chains, and the attached gasket to move upwardly therewith from station 3 to station 4, as illustrated in FIG. 11. The junction of the tubing and the gasket is under no stress which might cause them to be pulled apart. During the upward movement of the gripping apparatus, the tube welding bar 348 mounted on the outer gripping head is energized to produce the transverse sealing weld 22 on the tubing. The weld is accurately located a short distance above the attached gasket.

The conveyor chains 74 and the gaskets 14 mounted successively thereon are advanced one station by the upward movement of the gripping apparatus, and the tubing 16 is pulled over the mandrel 222 and advanced the same distance along the path of conveyor movement. As illustrated in FIGS. 11 and 14, the upward movement pulls the tubing between the external supporting rollers 224 and the mandrel rollers 246 in frictional engagement therewith. A frictional drag on the tubing is also produced by the felt members 316 at the lower end of the mandrel. The tubing is taut between the lower end of the mandrel and the gripping apparatus beyond the upper end of the mandrel. In this manner, the tubing is advanced in uniform increments or lengths with successive upward reciprocations of the gripping apparatus.

When the gripping apparatus reaches station 4, it continues to engage the conveyor chains and the tubing. At this time, with the tubing still taut over the mandrel and with the outer side 26 of the tubing held between the backstop 250 and the mandrel backing plate 232, the outer side is perforated, as illustrated in FIGS. 11 and 14. The gripping head pistons 336 then are vented to release pressure therefrom, whereupon the locking pins 342 are withdrawn from engagement with the conveyor chains and the outer gripping head 344 is withdrawn from engagement with the tubing by means of the retracting springs 341. The gripper piston 332 is operated to return the gripping apparatus to its lower retracted position at station 3. The remaining operations at station 3 commence after disengagement of the gripping apparatus and while the apparatus is being returned to station 3. The operations at station 3 and the gasket mounting operation at station 1 take place while the conveyor chains dwell between successive upward reciprocations of the gripping apparatus.

FIGS. 1 and 11 illustrate the manner in which additional tubing 16 is supplied to the mandrel 222 from the tubing roll 72. The roll is rotatably supported in holders 366 on the longitudinal mounting bars 62. A weighted strap 368 is suspended from above the roll and lies on its surface to provide a frictional drag. The tubing passes over a series of idler supply rollers 370, 372, 374, 376, and 378 mounted on the frame 44, and then is conveyed to the mandrel 222 and between the mandrel supporting rollers 224. Two single acting tubing supply pistons 380 and 382 having internal return springs 383 are mounted on the frame adjacent the path of movement of the tubing, and they are controlled cooperatively with each other by a solenoid-operated four-way air valve 380a (FIG. 26) connected to the air main. One piston 380, nearer the tubing roll 72, controls the withdrawal of tubing from the roll. The remaining piston 382 controls the feed of tubing to the mandrel.

The piston rod of the withdrawal piston 380 is connected to a movable clamp bar 384 on one side of the tubing in advance of a raised roller 372. A stationary clamp bar 386 is mounted on the opposite side of the tubing for clamping the tubing between the bars when the piston 380 is operated. Similarly, a movable clamp bar 388 is connected to the feed piston 382 on one side of the tubing adjacent a raised succeeding roller 374. A stationary clamp bar 390 is mounted on the opposite side of the tubing for clamping the tubing between the bars when the latter piston is operated. The pistons are connected to the solenoid valve 380a so that when one piston is operated to clamp the tubing, the other piston is vented and spring biased to release the tubing.

A tubing supply plunger 392 is mounted on the outer side of the reciprocable gripper mounting bar 322. The plunger includes a depending frame component 394 mounting an idler roller 396 and a holder bar 397 at its lower end. The plunger is arranged to move between the raised supply rollers 372 and 374, with the plunger roller 396 engaging the tubing 16 on the side opposite to the supply rollers. When the gripper piston 332 is operated to lower the gripper mounting bar 322 and the supply plunger 392 therewith, the withdrawal piston 380 is operated to release the tubing, and the feed piston 382 is operated to clamp the tubing, as illustrated in FIG. 1. As the plunger frame component 394 descends, it causes tubing to be removed from the roll 72. When the gripper piston 332 is operated to raise the gripping apparatus, the withdrawal piston 380 is operated to clamp the tubing, and the feed piston 382 is operated to release the tubing, as illustrated in FIG. 11. As the gripping apparatus and the plunger frame component 394 are moved upwardly, the tubing is advanced by the gripping apparatus, and a length of tubing equal to the length of the stroke is withdrawn over the rollers 374, 376, and 378. As seen in FIG. 11, the tube is slack between the rear raised roller 372 and the mandrel supporting rollers 224. The next downward movement of the plunger frame component 394 removes additional tubing from the roll 72 equal to the length of the stroke.

As the flat tubing 16 passes over the mandrel 222, the convergent nose member 231 thereof (FIG. 17) separates the opposite walls of the tubing. At times, the tubing may have imperfections, so that it engages the mandrel and tends to raise it from its proper position. As seen in FIG. 1, a lamp 398 and a photoelectric cell 400 are aligned on opposite sides of the tubing and on opposite sides of the mandrel light shield 248. So long as the light shield prevents light from reaching the cell and energizing it, operation continues. Should the mandrel be raised, the cell is energized and operations are discontinued, as subsequently described with reference to FIG. 26. Operations also are discontinued in the event that the tubing runs out. FIG. 22 illustrates a switch 402 mounted adjacent to the tubing above the first supply roller 370. Two switch contacts 404 are disposed on opposite sides of the tubing and are biased towards each other. They contact each other when no film is present, to complete a circuit which stops operation, as also described subsequently.

With each upward stroke of the gripping apparatus 320, the conveyor chains 74 moving therewith convey a gasket on the lugs 76 and the tubing attached to the gasket from station 4 to station 5. At the same time, a preceding gasket and length of tubing are advanced from station 5 to station 6 in like manner. The tubing is cut at station 5 to separate the successive length of tubing and to complete the production of a drainage device extending between station 5 and station 6.

Referring to FIGS. 1 and 23–25, the conveyor chains 74 are trained on sprockets 410 keyed to a shaft 412 at the top of the machine. The shaft is journaled in bearings 414 which are mounted on the upper longitudinal mounting bars 64. The chains change direction and travel horizontally between the mounting bars. An idler roller 416 is mounted on the shaft between the chains, and the roller supports the tubing 16 as it changes its direction of movement. A support pan 418 extends longitudinally between the chains, and the tubing and gaskets are supported thereby. Parallel guide bars 420 extend longitudinally on opposite sides of the support pan and the tubing thereon, to guide the conveyor lugs 76 and thus the tubing by engaging the depending lug fingers 80. A cover 422 overlies the tubing and the chains on top of the frame 44 centrally thereof. A guide plate 424 extends upwardly from the cover in the direction from which the tubing is conveyed, to facilitate passage of the tubing beneath the cover. An elongated transverse slot 426 is provided in the cover, and it registers with a corresponding opening 427 therebelow between adjacent sections of the tubing support pan 418.

A transverse cutoff mounting bar 428 is mounted in spaced relation above the cover 422 and the slot 426 thereof. The mounting bar and the cover are mounted on a lower transverse bar 430, in turn mounted on the longitudinal mounting bars 64. A single acting cutoff piston 432 having an internal return spring 433 is mounted on the cutoff mounting bar 428. The piston is operated by a solenoid-operated two-way valve 432a (FIG. 26) which is connected to the air main. A rectangular piston rod 434 is connected to a hot wire cutoff assembly 436 for reciprocating the assembly up and down. A cutoff wire 438 heated by electrical resistance is supported on the assembly by two depending arms 440. The wire is located centrally above the cover slot 426. The assembly is reciprocable between an upper position of the wire spaced above the cover, as illustrated in FIG. 24, and a lower position of the wire below the tubing support pan 418.

Each gasket 14 is positioned at station 5 as illustrated in FIG. 23. The cutoff assembly is located in advance of the gasket and also in advance of the transverse weld 22 on the tubing (FIG. 4) which was formed between stations 3 and 4. When the cutoff piston 432 is operated to reciprocate the hot wire, the wire passes through the cover slot 426 and the tubing therebeneath to sever the tubing adjacent the weld 22, as illustrated at the end 18 in FIG. 4. The wire then is returned to a position above the cover 422. A stream of air is directed into the tubing before, during, and after reciprocation of the cutoff assembly, by means subsequently described, to prevent the sides of the tubing from adhering to each other and to cool the severed edges. These operations take place while the conveyor chains 74 are stationary between successive upward reciprocations of the gripping apparatus 320.

When the gripping apparatus is advanced once more, the gasket 14 at station 5 and the attached tubing are conveyed by the chains 74 to station 6. The chains are trained on sprockets 442 (FIG. 25) which are keyed to a shaft 444 at the latter station. The shaft is journaled in bearings 446 mounted on the longitudinal mounting bars 64. The chains again change direction, and they travel downwardly towards the sprockets 86 (FIG. 6) at station 1.

The tubing support pan 418 extends from station 5 to station 6, extending beyond the sprocket shaft 444 and curving downwardly and inwardly therearound, as seen in FIG. 25. An end cover 448 extends from the center cover 422 to station 6, curving downwardly beyond the sprocket shaft 444. A guide strip 449 extends downwardly and inwardly from the center of the end cover. The end cover is provided with a pair of spaced longitudinal slots 450 (FIG. 23) which extend from the top of the cover into the curved portion. It will be seen in FIG. 25 that the tubing support pan 418 and the end cover 448 are spaced apart a distance which permits the tubing 16 to be inflated somewhat and separate its sides 26 and 24. The center cover 422 is also spaced from the support pan to permit such inflation.

An inflation nozzle 451 is mounted on one longitudinal mounting bar 64 at station 6, and it is operated by a solenoid valve 451a (FIG. 26) connected to the air main. A baffle 452 is interposed between the nozzle and the gasket and tubing at this station. The nozzle registers with a slot 454 in the baffle and a slot 455 in the support pan 418. The baffle is supported from a transverse bar 456 on the longitudinal mounting bars 64, which also serves to support the support pan 418. The nozzle is directed at the opening 32 in the gasket and the corresponding opening 28 in the tubing, so that the tubing is inflated when an air jet issues from the nozzle, as illustrated in FIGS. 24 and 25. The nozzle is operated to inflate the tubing before, during and following the tube cutting operation at station 5, as previously described.

A pair of discharge nozzles 458 are supported by the longitudinal mounting bars 64 and are directed into the slots 450 in the end cover 448. The nozzles are operated by a solenoid valve 458a (FIG. 26) connected to the air main. The nozzles are directed downwardly and inwardly against the outer side 26 of the tubing. Following the cutoff operation and the operation of the inflation nozzle 451, and as the conveyor chains 74 are next advanced, the discharge nozzles 458 are operated to blow the gasket 14 off of the conveyor lugs 76, which are in an inverted position at this time and easily separated. The force of the air jets causes the now severed and completed drainage device article 10 to be discharged between the inwardly curving guide strip 449 and the baffle 452. The articles are collected in a bin 460 (FIG. 1) suspended from the top of the frame. The conveyor lugs 76 move to a location between station 6 and station 1 as the article is discharged and a succeeding gasket is conveyed to station 6. When the conveyor is advanced again, the lugs are returned to station 1, to complete one circuit of the conveyor.

A control box 462 is mounted on top of the frame 44, as seen in FIG. 1. The various operating members are caused to operate automatically in timed relation by cam-actuated switches and timing means contained in the control box. Referring to FIG. 26, a series of cams and associated switches are schematically illustrated, and they are identified respectively by the numbers of the units operated thereby, with the addition of the letter b. Power is supplied to the controls through a main switch and circuit breaker 464 connected to positive and negative bus bars 466 and 468, respectively. The cams are mounted on a cam shaft 469 rotated by a continuously operating constant speed timing motor 470. The cam shaft and the motor are connected by a solenoid-controlled clutch 471 which normally disengages after one cycle of revolution unless the solenoid 472 thereof is energized. Normally, the clutch is disengaged mechanically after each cycle by a cam follower 473 engaging a cam track on one side of the clutch. Energization of the solenoid removes the follower from the track to prevent disengagement. Thus, timely energization of the solenoid causes the cam shaft to be driven continuously by the motor, and de-energization results in disconnection of the clutch after one revolution of the clutch and the cam shaft. The clutch solenoid 472 is connected in series with two operating switches, one being a single throw switch 474 and the other being a push button switch 476.

The machine is placed in operation and the main air supply valve 130a is opened by closing the main switch 464 and a timing motor start switch 478. The drive motor 152 in the gasket transfer assembly 150 is placed in operation by closing a start switch 480, and it operates continuously. Either of the operating switches 474 and 476 is closed. The single throw switch remains closed for continuous operation. The push button switch 476 is depressed to make contact and then released to break the circuit for one cycle intermittent operation. The heater cartridge 278 for the perforating head 266, and the cutoff wire 438 are continuously energized when the main switch is closed. The heating element 306 for the die 282 is energized when the main switch is closed, as controlled by the thermocouple 307 and a relay 306a.

When the machine has been placed in operation in the foregoing manner, the several operating mechanisms are operated in timed relation as the cams are rotated by the timing motor 470 and actuate the associated switches. The cams identified by respective like numbers operate the following solenoid valves: 264a for the perforator piston 264, 286a for the die piston 286, 122a for the gasket dispenser piston 122, 294a for the plunger piston 294, 336a for the gripping head pistons 336, 332a for the gripper piston 332, 380a for the tubing supply pistons 380 and 382, 458a for the discharge nozzles 458, 451a for the inflation nozzle 451, and 432a for the cutoff piston 432. The flap welding bar 256 is controlled by a cam-operated relay 256a. The tube welding bar 348 is controlled by a cam-operated relay 348a. As previously described, the cooling nozzle solenoid valve 314a is operated by the microswitch 313 on the machine.

Both of the normally open gasket inspection switches 206 must be closed by contact with a gasket during each cam cycle for operations to continue thereafter. Otherwise, the line to the clutch solenoid 472 is open, and operations are discontinued due to disengagement of the clutch 471 following completion of the cycle then in progress. The normally open film inspection switch 402 is connected to a relay 402a which opens the line to the clutch solenoid 472 when the switch closes due to the absence of tubing, thereby discontinuing operations following completion of the cycle in progress. The photoelectric cell 400 is connected to a relay 400a. When the cell is energized owing to movement of the mandrel 222 out of its proper position, the circuits to the solenoid valves 286a and 294a operating the die piston 286 and the plunger piston 294, respectively, are opened to thereby prevent the die and plunger from operating. The circuit to the clutch solenoid 472 also is opened, to discontinue the remaining operations following completion of the cycle in progress.

The sequence of operations is illustrated in the timing chart of FIG. 27. The periods of operation of the operating mechanisms that correspond to the periods for which the cams actuate their associated switches are shown with reference to the degree of rotation of the cam shaft 469. From 5° to 165° in each cycle of rotation, the gripping head pistons 336 (FIG. 19) are operated to cause the gripping apparatus to grip the tubing 16 and engage the conveyor chains 74. The gripping apparatus is disengaged from the tubing and disconnected from the conveyor for the remainder of the cycle. From 10° to 170°, the gripper piston 332 (FIG. 11) is operated to advance the gripping apparatus from station 3 to station 4 and hold the apparatus at station 4, thus advancing the tubing and the conveyor. During this portion of the cycle, the tubing supply pistons 380 and 382 are operated for supplying tubing to the mandrel, with the withdrawal piston 380 clamping the tubing and the feed piston 382 releasing the tubing. At the same time, the discharge nozzles 468 (FIG. 25) are operated to discharge an article 10. During the remainder of the cycle, the gripper piston 332 is operated to retract the gripping apparatus from station 4 to station 3, and the apparatus is held at station 3 until advanced by the gripper piston during the next cycle. The supply pistons 380 and 382 are operated for withdrawal of additional tubing from the roll 72 during the remainder of the cycle, the tubing being clamped by the feed piston 382 and released by the withdrawal piston 380. The discharge nozzles 458 are inoperative at this time.

The welding bar 348 (FIG. 21) is energized to seal the tubing from 20° to 32°, while the gripping apparatus is advanced. The bar is de-energized during the remainder of the cycle. The perforator piston 264 (FIG. 12) is operated to cause the perforating head 266 to perforate the tubing from about 163° to 170°, the perforation taking place while the tubing is held by the gripping apparatus. The perforating head is retracted for the remainder of the cycle.

The gasket dispenser piston 122 (FIG. 6) is operated to dispense a gasket from 190° to 250°. The piston is retracted during the remainder of the cycle. The die piston 286 (FIG. 12) is operated to advance the die 282 and the plunger 284, and to hold the die for mounting a gasket and severing a flap, from 190° to 250°. The piston is operated to retract the die and the plunger for the remainder of the cycle. The plunger piston 294 is operated to advance the plunger with respect to the die and to hold the plunger in advanced position from 210° to 260°. The plunger transfers and holds a flap while the die 282 is in its advanced position. The plunger is retracted with respect to the die by the plunger piston 294 at 260°, shortly after the die and the plunger are retracted together by the die piston 286. The flap welding bar 256 is energized to weld the flap to the tubing from 215° to 220°, while the plunger supports the flap against the tubing. The cooling nozzle 314 (FIG. 1) is operated from 250° to 190°, when the die is retracted.

The inflation nozzle 451 (FIG. 24) is operated from 270° to 320°, and it is inoperative for the remainder of the cycle. The cutoff piston 432 is operated to advance the cutoff assembly 436 to sever an article from 285° to 310°. The cutoff assembly is withdrawn during the remainder of the cycle.

The cycle of operation is repeated indefinitely with the continuous operation switch 474 (FIG. 26) closed. When the machine is operated by the push button switch 476 with the continuous switch open, the operations are discontinued after one cycle. Should a gasket be out of position, as indicated by the inspection switches 206, or should the tubing run out, as indicated by the inspection switch 402, operations are discontinued automatically following the cycle then in progress. Operations also are discontinued automatically at the end of a cycle in the event that the mandrel is removed from its proper position, as indicated by the photoelectric cell 400, and the die and plunger pistons 286 and 294 are operated immediately to retract the die and plunger in this event. When the machine is to be shut down, operation of the drive motor 152 and the timing motor 470 is discontinued by opening their respective switches 480 and 478. The air supply from the main is shut off by opening the latter switch. All operations are discontinued and all units are de-energized by opening the main switch 464.

The invention thus provides a machine which automatically and continuously produces articles of a colostomy drainage device efficiently and reliably in large scale production. The machine and its components may be employed to produce the illustrative drainage device and other types of drainage devices. The machine may be modified appropriately for use in the manufacture of other types of devices. Thus, for example, in the event that certain operations need not be performed or it is desired to perform them in advance or subsequently, the apparatus performing such operations may remain inoperative or be omitted. Additional operations may be performed by suitable alterations and additions to the apparatus. While a preferred embodiment of the machine has been disclosed, including perferred constructions, arrangements, and combinations of the component parts, it will be apparent that various changes and modifications may be made in the machine while accomplishing the objects of the invention and falling within its scope. It is intended that such changes and modifications be included within the scope of the appended claims.

I claim:

1. In a machine for manufacturing a colostomy drainage device or the like, said device including a flexible tubular body and a retainer gasket thereon, the combination of means for supporting flexible tubing, means for mounting an annular retainer gasket on the outer wall surface of a supported tubing, means for severing a portion of said supported tubing wall in the region bounded by said gasket to provide an opening therein, and means for mounting the severed wall portion on the opposite inner wall surface of said supported tubing.

2. In a machine for manufacturing a colostomy drainage device or the like, said device including a flexible tubular body and a retainer gasket thereon, the combination of means for supporting flexible tubing, means for forming a hole in the wall of a supported tubing, means for mounting an annular retainer gasket on the outer wall surface of said supported tubing opposite to said hole, means for severing a portion of said supported tubing wall in the region bounded by said gasket to provide an opening therein, and means for mounting the severed wall portion on the opposite inner wall surface of said supported tubing and overlying said hole.

3. In a machine for manufacturing a colostomy drainage device or the like, said device including a flexible tubular body and a retainer gasket thereon, the combination of means for supporting flexible tubing including a mandrel disposed internally of the tubing, said mandrel including a backing section having a die opening extending through the mandrel between opposite sides thereof, hole forming means externally mounted adjacent one side of said mandrel for forming a hole in the wall of a supported tubing registering with said die opening, gasket mounting means externally mounted adjacent the opposite side of said mandrel for cooperation with said backing section for mounting an annular retainer gasket on the wall of said supported tubing around said die opening, severing means externally mounted adjacent said mandrel opposite side for severing a portion of the wall of said supported tubing in the region bounded by said gasket and registering with said die opening to provide an opening in the wall, and transfer means externally mounted adjacent said mandrel opposite side for transferring the severed wall portion through said die opening to the opposite inner wall surface of said supported tubing for mounting the portion thereon and overlying said hole.

4. In a machine for manufacturing a colostomy drainage device or the like, said device including a flexible tubular body and a retainer gasket thereon, the combination of means for supporting flexible tubing to separate opposite sides of the tubing wall, hole forming means externally mounted adjacent one side of a supported tubing wall and including a member movable towards said wall to form a hole therein, means for disposing an annular retainer gasket in a position externally adjacent the opposite side of said wall and opposite to said hole forming means, gasket mounting means externally mounted adjacent said gasket position and including a member movable against a gasket and towards said wall for mounting the gasket on the wall, severing means externally mounted adjacent said gasket position and including a member movable through said gasket and towards said wall for severing a portion of the wall bounded by said gasket to provide an opening in the wall, transfer means externally mounted adjacent said gasket position and including a member movable through said gasket and towards said wall for transferring the severed wall portion to the inner surface of said wall one side for mounting the portion thereon and overlying said hole, and means for moving said movable members.

5. In a machine for manufacturing a colostomy drainage device or the like, said device including a flexible tubular body and a retainer gasket thereon, the combination of means for supporting flexible tubing including a mandrel disposed internally of the tubing, said mandrel including a backing section having a die opening extending through the mandrel between opposite sides thereof, means mounting said mandrel in a given location, means for supplying continuous tubing to said mandrel and for removing the tubing therefrom, hole forming means externally mounted adjacent one side of said mandrel and including a member reciprocably movable to and from the mandrel in register with said die opening for forming a hole in the wall of a supported tubing, a conveyor externally mounted for movement along a fixed path adjacent said mandrel, means on said conveyor for supporting individual annular retainer gaskets successively thereon for disposing gaskets successively in a position adjacent the opposite side of said mandrel in register with said backing section around said die opening and for removing said gaskets from said position, a die including an annular pressure plate and an annular severing edge disposed radially inwardly of the pressure plate, said die being externally mounted adjacent said gasket position for reciprocation to and from said backing section for cooperation therewith, said pressure plate registering with said backing section around said die opening for thereby pressing a gasket in said position on said supported tubing around the die opening, said severing edge registering with said die opening for thereby severing a portion of the tubing wall bounded by said gasket to provide an opening in the wall, a plunger disposed radially inwardly of said severing edge and externally mounted adjacent said gasket portion for reciprocation to and from said backing section and through said gasket in register with said die opening for thereby transferring the severed wall portion through said die opening to the opposite inner wall surface of said supported tubing for mounting the portion thereon and overlying said hole, welding means externally mounted adjacent said mandrel one side in register with said plunger, and timed means for successively: supplying tubing to said mandrel and moving said conveyor to dispose a gasket in said position, reciprocating said hole forming means to and from said mandrel to form a hole in the wall of said tubing, reciprocating said die to said backing section to press said gasket on said tubing and to sever a portion of the tubing wall, reciprocating said plunger to said backing section to mount the severed wall portion on said inner wall surface over said hole, operating said welding means cooperatively with said plunger movement to weld said severed wall portion to said inner wall surface to provide a valve flap over said hole, reciprocating said die and plunger members from said backing section whereby said tubing and said gasket thereon may be removed together, and removing said tubing and moving said conveyor to remove said gasket therewith while supplying additional tubing to said mandrel and disposing a successive gasket in said position.

6. In a machine for manufacturing a colostomy drainage device or the like, said device including a flexible tubular body and a retainer gasket thereon, the combination of a conveyor mounted for movement along a fixed path, means on said conveyor for supporting individual annular retainer gaskets successively thereon, means providing a plurality of successive operating stations along said path, means at a first station for placing gaskets individually on said gasket supporting means, means at a succeeding station for supporting flexible tubing adjacent said path including a mandrel disposed internally of the tubing, said mandrel including a backing section having a die opening extending through the mandrel between opposite sides thereof, said conveyor disposing said gaskets at said succeeding station successively in a position adjacent one of said mandrel sides in register with said backing section around said die opening and removing said gaskets from said position, means for supplying continuous tubing to said mandrel and for removing the tubing therefrom, gasket mounting means externally mounted adjacent said gasket position and including a member movable against a gasket and towards said backing section for cooperation therewith for mounting the gasket on a supported tubing around said die opening, severing means externally mounted adjacent said gasket position and including a member movable through said gasket and towards said backing section for severing a portion of the wall of said supported tubing bounded by said gasket and registering with said die opening to provide an opening in the wall, transfer means externally mounted adjacent said gasket position and including a member movable through said gasket and towards said backing section for transferring the severed wall portion through said die opening to the opposite inner wall surface of said supported tubing for mounting the portion thereon, and means for moving said conveyor and said movable members and operating said gasket placing means and said tubing supplying and removing means in timed relation to: dispose a first gasket in said position at said succeeding station and supply tubing to said mandrel; mount said first gasket on said tubing, sever a wall portion of said tubing, mount the severed wall portion on said tubing inner surface, and place a gasket on said gasket supporting means at said first station while said first gasket is in said position; and thereafter remove said first gasket mounted on said tubing and the tubing therewith from said succeeding station while conveying a successive gasket and supplying additional tubing thereto.

7. In a machine for manufacturing a colostomy drainage device or the like, said device including a flexible tubular body and a retainer gasket thereon, the combination of a conveyor mounted for movement along a fixed path, means on said conveyor for supporting individual annular retainer gaskets successively thereon, means for supporting flexible tubing adjacent said path, said tubing supporting means including a mandrel disposed internally of the tubing and externally mounted means for supporting the mandrel with the tubing interposed therebetween, said mandrel including a backing section having a die opening extending through the mandrel between opposite sides thereof, said conveyor disposing said gaskets successively in a position adjacent one of said mandrel sides in register with said backing section around said die opening, hole forming means externally mounted adjacent the opposite side of said mandrel for forming a hole in the wall of a supported tubing in register with said die opening, gasket mounting means externally mounted adjacent said gasket position for cooperation with said backing section for mounting a gasket on said supported tubing around said die opening, severing means externally mounted adjacent said gasket position for severing a portion of the wall of said supported tubing bounded by said gasket and registering with said die opening to provide an opening in the wall, transfer means externally mounted adjacent said gasket position for transferring the severed wall portion through said die opening to the opposite inner wall surface of said supported tubing for mounting the portion thereon and overlying said hole, means for supplying continuous tubing to said mandrel with the tubing travelling between the mandrel and said mandrel supporting means and then over said backing section, means for releasably gripping said supported tubing beyond said mandrel mounted for reciprocation along said path between retracted and advanced positions, means for detachably connecting said gripping means to said conveyor for conjoint movement, means for reciprocating said gripping means between said positions, timed means operatively associated with said gripping means, with said connecting means and with said reciprocating means for gripping said tubing, for connecting said gripping means to said conveyor and for reciprocating said gripping means from said retracted position to said advanced position to convey said tubing and a gasket mounted thereon from said mandrel while supplying additional tubing to the mandrel and conveying a successive gasket to said gasket position, and for thereafter releasing said tubing, disconnecting said gripping means from said conveyor and reciprocating said gripping means from said advanced position to said retracted position, and timed means for operating said hole forming means while said gripping means grips said tubing.

8. A machine as defined in claim 7 including tube sealing means on said gripping means, and timed means for operating said sealing means while said gripping means grips said tubing.

9. In a machine for manufacturing a colostomy drainage device or the like, said device including a flexible tubular body and a retainer gasket thereon, said machine including means for mounting an annular retainer gasket on the outer wall surface of a supported flexible tubing and means for severing a portion of the tubing wall bounded by the gasket and transferring the severed portion to the opposite inner wall surface of the tubing, the combination of means for supporting flexible tubing including a mandrel disposed internally of the tubing and means for supporting the mandrel with the tubing interposed therebetween, said mandrel including a backing section for cooperation with said gasket mounting means, said backing section having a die opening extending through the mandrel between opposite sides thereof for cooperation with said severing and transferring means, means for supplying continuous tubing to said mandrel with the tubing travelling between the mandrel and said mandrel supporting means and then over said backing section, means for gripping said supported tubing adjacent said mandrel therebeyond, and means for moving said gripping means to advance said supported tubing.

10. In a machine for manufacturing a colostomy drainage device or the like, said device including a flexible tubular body and a retainer gasket thereon, said machine including means for mounting an annular retainer gasket on the outer wall surface of a supported flexible tubing and means for severing a portion of the tubing wall bounded by the gasket and transferring the severed portion to the opposite inner wall surface of the tubing, the combination of means for supporting flexible tubing including a mandrel disposed internally of the tubing and means for supporting the mandrel with the tubing interposed therebetween, said mandrel including a backing section for cooperation with said gasket mounting means, said backing section having a die opening extending through the mandrel between opposite sides thereof for cooperation with said severing and transferring means, and means for supplying continuous tubing to said mandrel with the tubing travelling between the mandrel and said mandrel supporting means and then over said backing section.

11. In a machine for manufacturing a colostomy drainage device or the like, said device including a flexible tubular body and a retainer gasket thereon, said machine including means for mounting an annular retainer gasket on the outer wall surface of a supported flexible tubing and means for severing a portion of the tubing wall bounded by the gasket and transferring the severed portion to the opposite inner wall surface of the tubing, the combination of means for supporting flexible tubing including a mandrel disposed internally of the tubing, said mandrel including a backing section for cooperation with said gasket mounting means, said backing section having a die opening extending through the mandrel between opposite sides thereof for cooperation with said severing and transferring means.

References Cited

UNITED STATES PATENTS

| | | | |
|---|---|---|---|
| 2,440,749 | 5/1948 | Klock | 156—552 |
| 3,069,303 | 12/1962 | Scholle | 156—552 |
| 3,283,671 | 11/1966 | Campbell | 156—510 |

EARL M. BERGERT, *Primary Examiner.*

DOUGLAS J. DRUMMOND, *Assistant Examiner.*